(12) United States Patent
Brown et al.

(10) Patent No.: US 9,183,285 B1
(45) Date of Patent: Nov. 10, 2015

(54) DATA CLUSTERING SYSTEM AND METHODS

(71) Applicant: Next IT Corporation, Spokane, WA (US)

(72) Inventors: Fred A Brown, Colbert, WA (US); Tanya M Miller, Colbert, WA (US); Charles C Wooters, Annapolis, MD (US); Megan Brown, Colbert, WA (US); Molly Q Brown, Colbert, WA (US)

(73) Assignee: Next IT Corporation, Spokane, WA (US)

( * ) Notice: Subject to any disclaimer, the term of this patent is extended or adjusted under 35 U.S.C. 154(b) by 0 days.

(21) Appl. No.: 14/470,856

(22) Filed: Aug. 27, 2014

(51) Int. Cl.
*G06F 17/30* (2006.01)

(52) U.S. Cl.
CPC ............................... *G06F 17/30705* (2013.01)

(58) Field of Classification Search
CPC ..................... G06F 17/30598; G06F 17/30705; G06F 17/30722
USPC .......................................................... 707/740
See application file for complete search history.

(56) References Cited

U.S. PATENT DOCUMENTS

| | | | |
|---|---|---|---|
| 6,842,751 B1 * | 1/2005 | Vilalta et al. | |
| 8,677,377 B2 | 3/2014 | Cheyer et al. | |
| 2008/0249999 A1 * | 10/2008 | Renders et al. | 707/4 |
| 2013/0268534 A1 * | 10/2013 | Mathew et al. | 707/740 |
| 2014/0122486 A1 * | 5/2014 | Simard et al. | 707/737 |

\* cited by examiner

*Primary Examiner* — Rehana Perveen
*Assistant Examiner* — Alexander Khong
(74) *Attorney, Agent, or Firm* — Lee & Hayes, PLLC

(57) ABSTRACT

Data having some similarities and some dissimilarities may be clustered or grouped according to the similarities and dissimilarities. The data may be clustered using agglomerative clustering techniques. The clusters may be used as suggestions for generating groups where a user may demonstrate certain criteria for grouping. The system may learn from the criteria and extrapolate the groupings to readily sort data into appropriate groups. The system may be easily refined as the user gains an understanding of the data.

16 Claims, 24 Drawing Sheets

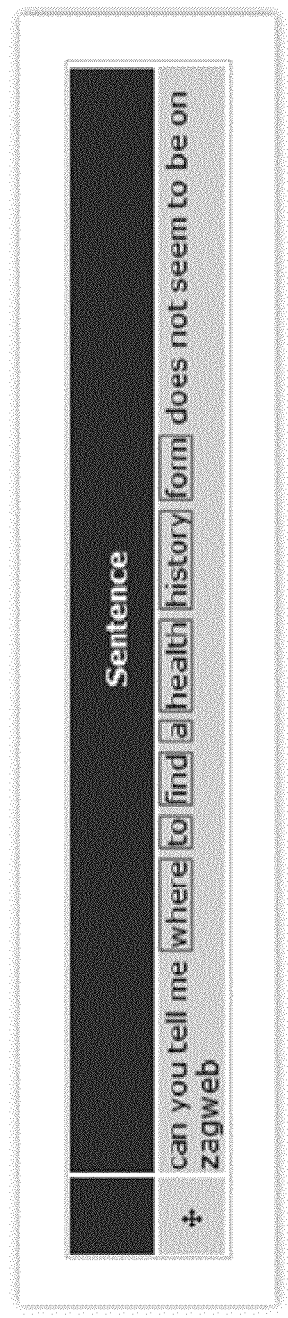
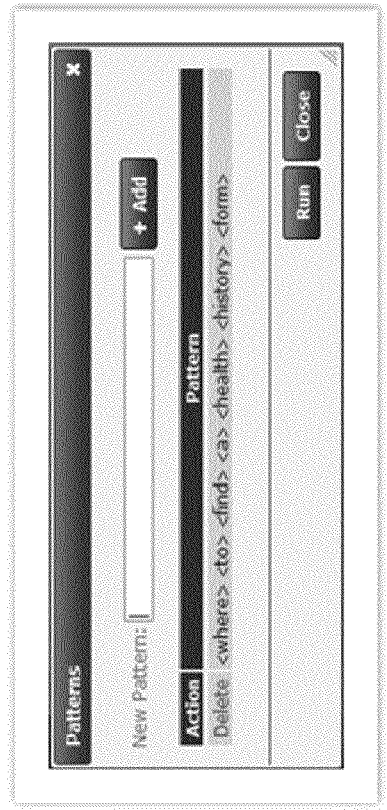
Fig. 16A
Fig. 16B

DATA CLUSTERING SYSTEM AND METHODS

BACKGROUND

Large amounts of data are collected every day. Often, people attempt to understand the data in order to leverage the data. The amount of data may be overwhelming for humans to easily understand without the help of tools. Various tools that are available in the natural language space often require a linguistic background, and often significant training and/or experience, in order to effectively use the tools. Accordingly, there is a need for a tool that allows a user to gain an understanding of large amounts of data without requiring that the user gain significant training or experience to operate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 13A-23 show various illustrative user interfaces and displays.

DETAILED DESCRIPTION

This disclosure describes, in part, data clustering and organizing systems and methods. In some instances, data may be clustered according to predefined algorithms, for example, agglomerative clustering. In some instances, data may be grouped based on emulation and extrapolation of user provided guidance and/or examples. Various embodiments contemplate allowing a user to analyze large amounts of data. For example, a user, in a first instance, may readily and rapidly determine what data is alike and what data is different with respect to a first set of criteria or first view point. Additionally, the user, in a second instance, may readily and rapidly determine what data is alike and what data is different with respect to a second set of criteria or second view point. In these examples, the user may use the same data in the first and second instances, or may use subsets of the data in each or either instance.

For example, various embodiments contemplate helping the user to understand how a set of inputs relate to each other. Various embodiments contemplate grouping certain inputs into groups, for example, buckets, of similar characteristics. For example, a set of natural language inputs may be grouped into buckets of similar intents.

Various embodiments contemplate allowing a user to view and/or analyze data in an aggregate form. While data may still be analyzed one by one in various embodiments, viewing and/or analyzing the data in an aggregated form may provide additional efficiency in analyzing and/or understanding the data. For example, this may allow a user to approach the data and identify any problem areas represented by the data from a holistic approach and may further allow a strategic approach to refine or resolve the identified problems. For example, in a natural language setting, a user analyzing a large dataset of conversations from a helpline call or chat may holistically identify problem areas of the underlying service and allow the user to strategically address those areas identified, for example, by addressing the most frequent problems first.

Illustrative Clustering

Figure 1:
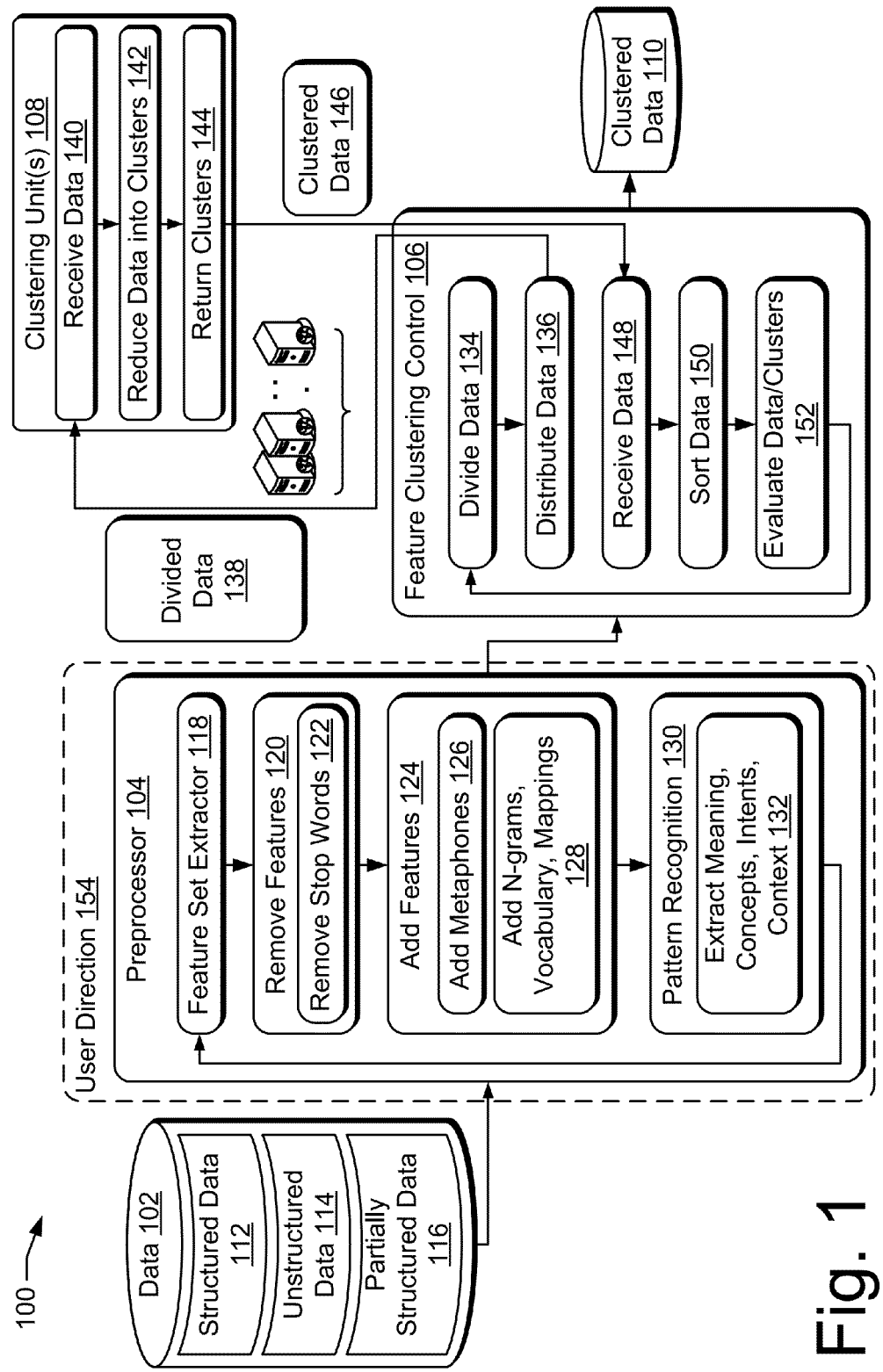
FIG. 1 shows an illustrative system for clustering data.

FIG. 1 shows an illustrative system for clustering data. For example, FIG. 1 shows clustering system 100 comprising data to be clustered 102, a preprocessor 104, a feature clustering control unit 106, one or more clustering units 108, and clustered data 110. Various embodiments contemplate that the data to be clustered 102 may comprise structured data 112, unstructured data 114, partially structured data 116, or combinations thereof.

Additionally or alternatively, FIG. 1 shows a preprocessor 104 that may comprise a feature set extractor 118. For example, a feature set extractor 118 may extract features from the data. For example, the feature set extractor 118 may comprise a string generator that may generate a string that represents each data of the data to be clustered 102. For example, a string that represents a data entry may include the data entry, a portion of the data entry, additional features, or combinations thereof. For example, FIG. 1 also shows a remove features unit 120, where, for example, elements present in the data that does not help to compare or contrast the data may be removed. For example, stop words 122 may be removed in a natural language setting. For example, a stop word may comprise some words may be used frequently in the data, but are not helpful in grouping the data. For example, the terms "the" may not be helpful and may be ignored. Additionally or alternatively, in a natural language setting dealing with a specific subject for example, an organization, the organization's name may not be helpful in determining useful groupings and may be ignored. The words used as stop words may be based on a static list of words, a tailored list of words, or combinations thereof. Often, it may be desirable to specify stop words based at least in part on the context of the data and the context in which the user is trying to understand the data. Various embodiments contemplate that the removal of features may be easily accessed and tailored to more readily understand the data given the context of the user and data.

FIG. 1 also shows an add features unit 124 where, for example, features may be added to the data strings. For example, in the context of a natural language situation, it may be beneficial to add metaphones 126 and/or N-grams, vocabulary, mappings 128. For example, an N-gram may comprise bigrams, trigrams, etc. of words in the data to better generalize the terms in the data. Additionally or alternatively, vocabulary terms may be added. For example, vocabulary terms may include synonyms of a term or groups of words.

Additionally or alternatively, various embodiments contemplate leveraging mappings. For example, a dataset may contain elements that on the surface appear to be disparate, but for the purposes of a given situation may be considered as a single element. As such, when one or more of the disparate features appears, for clustering and/or grouping procedures, a replacement feature may be substituted. For example, in a natural language setting directed to a medical application, terms such as Ritalin, Prozac, Xanax, insulin, aspirin, may be mapped to the term "medicine." This may allow data directed to the concept of medicine to be grouped together more readily. Various embodiments contemplate this as a combination of adding features (the generalized mapped feature) and removing features (the specific mapped feature). The features added, for example in N-grams, vocabulary, mappings 128, may be based on a static list of words, a tailored list of words, or combinations thereof. Often, it may be desirable to specify added features based at least in part on the context of the data and the context in which the user is trying to understand the data. Various embodiments contemplate that the addition of features may be easily accessed and tailored to more readily understand the data given the context of the user and data.

The preprocessor 104 may also comprise pattern recognition 130 to preprocess the data. For example, pattern recognition 130 may allow for identification of patterns in the data. Various embodiments contemplate identifying patterns in speech, language, text, images, sounds, among others. For example, natural language processing may identify additional meaning in the data. Additionally or alternatively, the pattern recognition 130 may extract meaning, concepts, intents, context 132 among other features in the data. For example, a conversation may provided.

The pattern recognition 130 may be configured to identify (e.g., determine) one or more pieces of contextual information. The pattern recognition 130 may take into account contextual information when determining an intent or meaning of a piece of data, for example, a user's query. Additionally or alternatively, context may be taken into account when determining a response or reply to provide back to the user. Additionally or alternatively, a response or reply provided to a user may provide context itself. Additionally or alternatively, by taking into account meanings, intents, concepts, and/or context and understanding of the data may be gained that more closely emulates human-to-human interaction and understanding of a piece of data, in comparison to traditional techniques for understanding data.

Further, in some instances the pattern recognition 130 may take into account contextual information that does not include an inquiry or initiation of an action from a user. For example, the pattern recognition 130 may use a location, environment, and/or setting of a user to determine when the user has, for example, arrived at a particular location. Upon arrival at the particular location, information may have been presented that is relevant to that location (e.g., provided a boarding pass upon arrival at an airport). In this example, the extracted context information may provide insights into understanding of the data, for example, by highlighting a meaning, concept, and/or intent.

Generally, contextual information may comprise any type of information that aids in understanding the meaning of a data. In some instances, contextual information is expressed as a value of one or more variables, such as whether or not a user has signed in with a site (e.g., "is_signed_in=true" or "is_signed_in=false"). Contextual information may be stored in a context data store. Example, non-limiting pieces of contextual information may include:

interaction information between a user and a virtual assistant, either during the current session or during a previous session(s) (e.g., a conversation history (input and/or response) during a current or previous conversation session, a navigation history of the user during a conversation session prior to the user providing a query to the virtual assistant, etc.);

input history indicating one or more input modes that a user has used to interact with a user interface;

what type of input mode the user prefers to interact with a virtual assistant (e.g., input mode—whether the user prefers to submit a query textually, using voice input, touch input, gesture input, etc.), the preferred input mode may be inferred from previous interactions, explicit input of the user, profile information, etc.;

calendar information describing one or more events of a user (e.g., a scheduled flight, a work meeting, etc.);

a location of a cursor on a site when a user provides input to a virtual assistant;

a time of day or date on which a user provides input to a virtual assistant;

an age or gender of a user;

a location of a user (e.g., a geo-location of the user associated with a device through which the user provides a query, location based on network information, address of the user, etc.);

sensor information obtained from a sensor of a device with which a user is interacting (e.g., a geo-location, environmental data including background noise or video/audio from a surrounding of the device, etc.);

a device type from which a user interacts with a virtual assistant (e.g., a mobile device, a desktop computer, game system, etc.);

an orientation of a device which a user is using to interact with a virtual assistant (e.g., landscape or portrait);

a communication channel which a device of a user uses to interface with the virtual assistant service (e.g., wireless network, wired network, etc.);

a language associated with a user (e.g., a language of a query submitted by the user);

how an interaction with a virtual assistant is initiated (e.g., via user selection of a link or graphic, via the virtual assistant proactively engaging a user, etc.);

how a user has been communicating recently (e.g., via text messaging, via email, etc.);

information derived from a user's location (e.g., current, forecasted, or past weather at a location, major sports teams at the location, nearby restaurants, etc.);

current topics of interest, either to a user or generally (e.g., trending micro-blog or blog topics, current news, recent micro-blog or blog posts made by the user, etc.);

whether or not a user has signed-in with a site of a service provider (e.g., with a user name and password);

a status of a user with a service provider (e.g., based on miles flown, a type of membership of the user, a type of subscription purchased by the user, etc.);

a page of a site from which a user provides a query to a virtual assistant;

how long a user has remained on a page of a site from which the user provides a query to the virtual assistant;

social media information (e.g., posts or other content posted to a social networking site or blog);

a user preference (e.g., a seat preference, a home airport, a preference of whether schedule or price is important to a user, a type of weather a user enjoys, types of items acquired by a user and identifying information for those items, types of stock a user owns or sold, etc.);

user profile information (e.g., information identifying friends/family of a user, information identifying where a user works or lives, information identifying a car a user owns, etc.);
any characteristic of a user;
location of a sample taken;
environmental conditions of an interaction;
settings of hardware or software at particular time;
the medium of data collection;
any characteristic of collected information.

FIG. 1 also shows feature clustering control 106 which may coordinate the clustering of the data. For example, feature clustering control 106 may comprise a divide data unit 134 that may take the modified data and divide it into portions of data that may be distributed by the distribute data unit 136. For example, the distribute data unit 136 may distribute the divided data 138 to one or more clustering units 108. Various embodiments contemplate that clustering unit 108 will receive the divided data 138 at a receive data unit 140 and reduce the data into clusters according a clustering algorithm at a reduce data unit 142. Various embodiments contemplate using various forms of clustering and/or clustering techniques, for example, as discussed below. Various embodiments contemplate returning the reduced data by the return clusters unit 144. Various embodiments contemplate receiving the clustered data 146 at the receive data unit 148 in the feature clustering control 106. The feature clustering control 106 may sort the data by a sort data unit 150 where clustered data from the one or more clustering units 108 is assembled together. Various embodiments contemplate that the sorted data and data clusters may be evaluated by the evaluate data/clusters unit 152. For example, a threshold number of clusters may be set where when the total number of clusters reaches the threshold the clustering process is terminated. Additionally or alternatively, a number of data per cluster threshold may be set where when a total number of data represented by a cluster reaches the threshold, the clustering process is terminated. Additionally or alternatively, if a threshold is not met, then the process may be repeated. For example, the sorted clustered data may be divided and distributed to the clustering units for additional clustering.

Various embodiments contemplate integrating user direction 154 into clustering system 100. For example, user direction 154 may comprise a type of human coaching of the system. For example, a human may be able to quickly coach the system to cluster the data in a meaningful and/or useful way much quicker than traditional coding of statistical methods provide. Various embodiments contemplate iterating the clustering of the data. For example, a smaller set of data may be clustered and the results may be evaluated. Based on this evaluation, additional features may be added, removed, or substituted. Using the smaller set of data, a larger set of data may be processed using the updated additional features. Additionally or alternatively, various embodiments contemplate receiving user direction to select, change, and/or include various clustering algorithms.

Additionally or alternatively, various embodiments contemplate the user direction 154 may be used to set, modify, eliminate, and/or adjust portions of the preprocessor 104. For example, a user may change certain stop words 122 to be eliminated, add mappings, weight various contextual features, ignore certain intents, and/or combinations thereof among others.

Illustrative Grouping/Bucketizing

Figure 2:
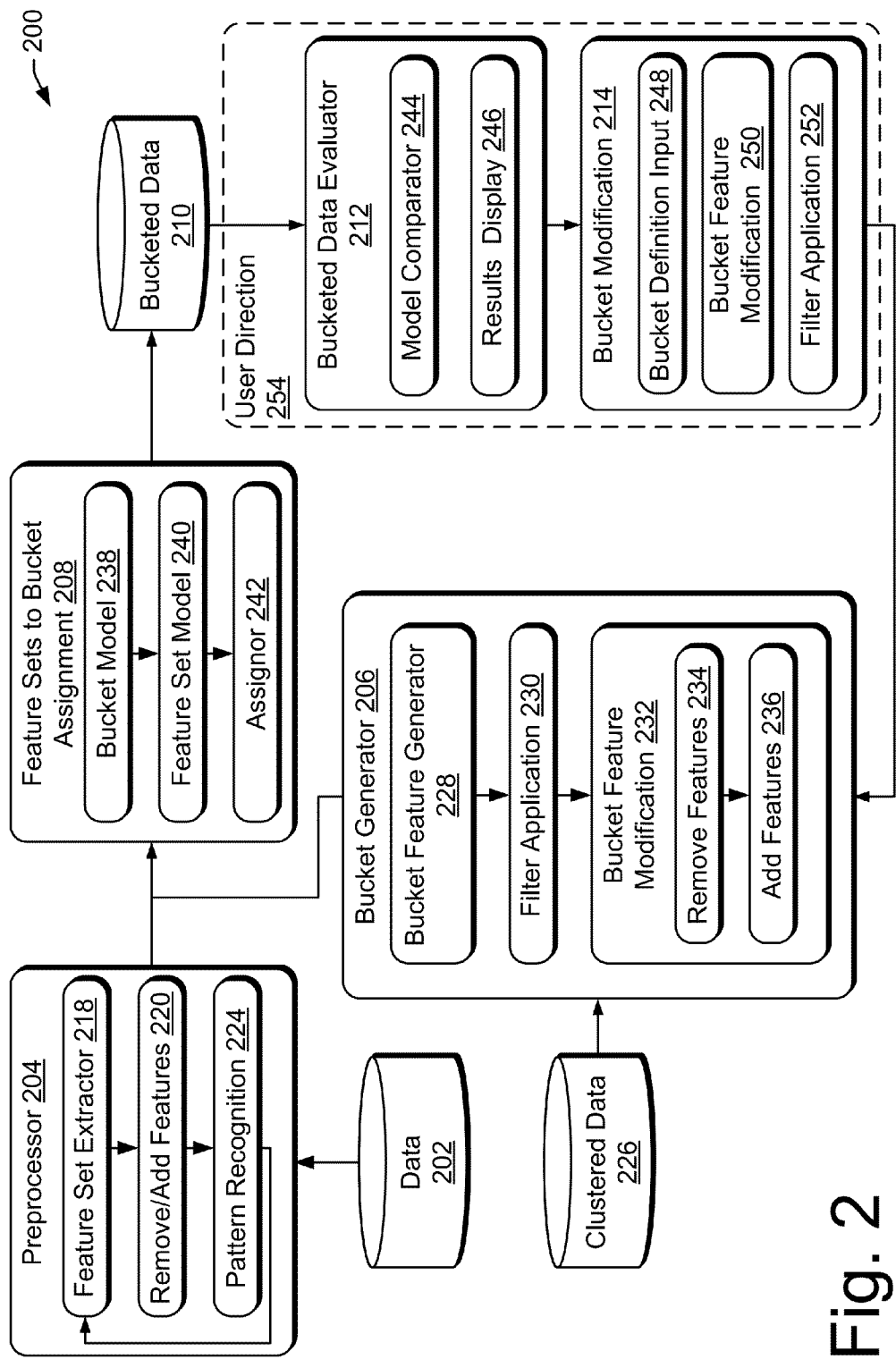
FIG. 2 shows an illustrative system for grouping and/or bucketizing data.

FIG. 2 shows an illustrative system for grouping and/or bucketizing data. For example, FIG. 2 shows grouping system 200 comprising data to be grouped 202, a preprocessor 204, a bucket generator 206, a feature sets to bucket assignment unit 208, bucketed data 210, a bucket data evaluation unit 212, and a bucket modification unit 214. Various embodiments contemplate that the data to be grouped 202 may comprise structured data, unstructured data, partially structured data, or combinations thereof.

Additionally or alternatively, FIG. 2 shows a preprocessor 204 that may comprise a feature set extractor 218. For example, a feature set extractor 218 may extract features from the data. For example, the feature set extractor 218 may comprise a string generator that may generate a string that represents each data of the data to be grouped 202. For example, a string that represents a data entry may include the data entry, a portion of the data entry, additional features, or combinations thereof. For example, FIG. 2 also shows a remove/add features unit 220, where, for example, elements present in the data that does not help to compare or contrast the data may be removed. For example, stop words may be removed in a natural language setting similar to the example discussed above with respect to data clustering. Additionally or alternatively, features may be added to the feature sets. For example, in the context of a natural language situation, it may be beneficial to add metaphones and/or bigrams, trigrams, etc. of words in the data to better generalize the terms in the data. Additionally or alternatively, various embodiments contemplate leveraging mappings similar to the example discussed above with respect to the data clustering.

FIG. 2 also shows pattern recognition 224 that may identify patterns in the data, including, but not limited to language patterns, textual patters, image patterns, auditory patterns, visual patterns, motion patterns, among others. Additionally or alternatively, various embodiments contemplate that pattern recognition 224 may allow for identification and/or extraction of meanings, concepts, intents, and/or concepts of the data. Additionally or alternatively, various embodiments contemplate preprocessor 204 having features and capabilities similar or equivalent to the preprocessor 104 as discussed with respect to FIG. 1. Various embodiments contemplate that Preprocessor 204 is the same preprocessor as 104.

FIG. 2 also shows bucket generator 206 which may be used to generate groups and/or buckets for grouping the data 202. Various embodiments contemplate using clustered data 226, which may be similar to clustered data discussed with respect to FIG. 1, as suggestions for buckets. Various embodiments contemplate that the bucket generator 206 may generate a bucket string with the bucket feature generator 228. Various embodiments contemplate that the bucket feature generator 228 may generate a string that represents each group and/or bucket that the data to be grouped 202 may be associated with. For example, a string that represents a group and/or bucket may include the data already associated with the group and/or bucket, a portion of the data already associated with the group and/or bucket, classifications of the groups and/or buckets, an expression, or combinations thereof. Various embodiments contemplate that if a group and/or bucket is solely based on a cluster of the clustered data 226, the bucket string may be similar to and/or share a significant portion of the string representing the cluster of the clustered data 226.

FIG. 2 also shows filter application 230 where various filters may be applied to the buckets. For example, it may be desirable to focus on a subset of the buckets. For example, a set of clustered data may suggest a wide range of buckets. However, the data to be grouped 202 may have some structure and/or may be directed to a subset of the buckets. In that situation, it may be beneficial to allow the system to focus on the filtered buckets as opposed to all of the buckets based on the clustered data.

FIG. 2 also shows bucket feature modification 232 where the bucket feature sets, for example, strings, may be modified. For example, it may be useful to add features, remove features, substitute features, or combinations thereof. For example, FIG. 2 also shows a remove features unit 234, where, for example, elements present in the data that does not help to compare or contrast the data may be removed. For example, stop words may be removed in a natural language setting similar to the example discussed above with respect to data clustering.

FIG. 2 also shows an add features unit 236 where, for example, features may be added to the data strings. For example, in the context of a natural language situation, it may be beneficial to add metaphones and/or bigrams, trigrams, etc. of words in the data to better generalize the terms in the data. Additionally or alternatively, various embodiments contemplate leveraging mappings similar to the example discussed above with respect to the data clustering. Additionally or alternatively, various embodiments contemplate that the bucket generator 206 may also comprise pattern recognition. Additionally or alternatively, various embodiments contemplate that the bucket feature modification 232 comprises similar or equivalent features and capabilities as preprocessor 204.

FIG. 2 shows feature sets to bucket assignment unit 208 where the data to be grouped 202 may be associated with buckets generated by the bucket generator 206. For example, various embodiments contemplate that the feature set to bucket assignment unit 208 may comprise a bucket model 238, feature set model 240, and/or an assignor 242. For example, various embodiments contemplate comparing a string representing a portion of the data 202 to the strings representing the buckets. Various embodiments contemplate that when a string representing a portion of the data 202 matches a portion of a string representing a bucket, the string representing the data is matched and associated with the bucket represented by the matched bucket string. Various embodiments contemplate storing the data 202 with the associated buckets in the bucketed data 210. Data that did not match a bucket, may also be stored in the bucketed data 210. Various embodiments contemplate that the data that did not match a bucket may be associated in a general group designating as much, for example, the data may be considered unassigned.

Additionally or alternatively, various embodiments contemplate that the bucket model 238 may generate a model of the buckets. Various embodiments contemplate that the bucket model 238 may comprise a statistical model, a classification model, or combinations thereof. Additionally or alternatively, various embodiments contemplate that the feature set model 240 may generate a model of the feature sets. Various embodiments contemplate that the feature set model 240 may comprise a statistical model, a classification model, or combinations thereof. Additionally or alternatively, various embodiments contemplate that the assignor 242 may assign feature sets to buckets based at least upon the bucket model 238 and the feature set model 240. Various embodiments contemplate that the assignor 242 may assign feature sets to buckets based on mathematical, statistical, geometrical, and/or other approaches. For example, a feature set from the feature set model 240 may be compared to the bucket model 238 based on a Euclidian distance model in n-space. For example, a feature set may be associated with the closest bucket based at least in part on a distance between the two in the Euclidian space. Additionally or alternatively, various embodiments contemplate determining a distance based at least in part on a Chebyshev distance along the most significant dimension, a Hamming distance based the difference bit by bit of two strings, a Mahalanobis distance that may be normalized based on a covariance matrix to make the distance metric scale-invariant, a Manhattan distance along axis-aligned directions, a Minkowski distance, or combinations thereof.

The bucketed data 210 may be evaluated in the bucketed data evaluator 212. For example, the bucketed data may be evaluated using various techniques. For example, the bucketed data 210 may be compared against various models by model comparator 244. Various embodiments contemplate that a model for comparison may be one or more statistical models. Various embodiments contemplate providing a confidence level that one or more data associated with a bucket is a best match for that bucket. For example, a model may suggest that one entry associated with a first bucket may have a higher confidence level of being associated with a second bucket.

Additionally or alternatively, various embodiments contemplate displaying the bucketed data 210 in one or more forms to a user by the results display unit 246. For example, the results display 246 may provide a user with a graphical representation of the bucketed data distribution. Various embodiments contemplate a displaying the bucketed data via a heat map. For example, a display may show buckets grouped by the number of bucket members where buckets with a relative amount to other buckets are grouped. For example, buckets may be separated into groups with small, medium, and large number of members. Various embodiments contemplate that bucket members may be related to or the same as the amount of data associated with the respective bucket. Additionally or alternatively, various embodiments contemplate displaying the bucketed information in a hierarchal fashion, where buckets may be listed by name or other configuration where sub-buckets may be shows below and/or as part of the parent bucket. A host of other ways of displaying the bucketed data are contemplated by this disclosure as one of ordinary skill in the art would recognize and do not stray from the scope of this disclosure.

Additionally or alternatively, various embodiments contemplate displaying data associated with the model comparator 244 with the bucketed data. For example, the results display 246 may provide an indication that a portion of the data associated with a bucket has a strong, weak, or moderate confidence of association with the bucket. Various embodiments contemplate indicating this information by way of color codes, pie chart symbols, percentages, lists, other visual or auditory indications, or combinations thereof.

FIG. 2 also shows bucket modification unit 214 that may comprise a component to receive input from a user that an input should be associated with a bucket. For example, an input for a user may be received by bucket definition input unit 248 that a piece of data should be associated with a first bucket. Various embodiments contemplate that the piece of data may have been previously unassigned or unassociated with a bucket or may have been previously associated with a second bucket. Additionally or alternatively, the model comparator 244 may supply suggestions based at least in part on a comparison model of the piece of data and the first and/or second bucket. A user may use this suggestion or information to associate the piece of data with the first bucket.

Additionally or alternatively, a bucket may be modified by defining additional criteria for the bucket. For example, in a natural language setting, a string could be added that models the type of input or data that should be associated with the bucket. The string may include wildcards, place holders, mappings, order requirements, proximity requirements, or combinations thereof among other possibilities.

Based at least in part on the bucket definition input 248, bucket features, for example, bucket strings, may be modified by the bucket feature modification unit 250. For example, if a piece of data is associated with a first bucket, the bucket string representing the first bucket may be modified or regenerated to include information about the piece of data to be included. Various embodiments contemplate that the bucket string representing the second bucket that the piece of data had been may be modified or regenerated to exclude the piece of data from the associated bucket. Similarly, the bucket strings may be modified or regenerated to capture the modifications of the buckets captured in the additional criteria added as discussed above.

Additionally or alternatively, a filter may be applied by the filter application 252. For example, it may be beneficial to limit the buckets evaluated and/or subsequently run by filtering out certain buckets and/or data. For example, it may be beneficial to limit the data to be bucketized to data that was unassigned previously.

Various embodiments contemplate that a user may provide some direction, for example in the areas demarked by the broken line indicating user direction 254. While this is not the exclusive area where a user may provide direction and input, various embodiments contemplate that a large portion of the user direction and/or input may come in the form of interaction with these units.

Additionally or alternatively, various embodiments contemplate additional application and/or runs of the system 200. For example, various embodiments contemplate that the modified bucket features, for example, strings, may be used as the bucket features, for example, bucket strings, of the bucket generator 206 that may be used to compare to the data to be grouped 202. Various embodiments contemplate that the data to be grouped 202 may comprise unassigned data as previously designated in bucketed data 210. Additionally or alternatively, the data to be grouped 202 may be a set of data different from the original data to be grouped 202. For example, various embodiments contemplate taking a large corpus of data, selecting a subset of the data (may be random or strategic selection) applying a first bucket generation to match the selected subset of the data to the buckets of the first bucket generation, and modifying the bucket definitions based at least on the results. Various embodiments contemplate using the modified bucket definitions to compare against a second subset of data from the large corpus of data, and adjusting the bucket definitions based at least in part on the results. Various embodiments contemplate a limited number of iterations to a large number of iterations depending on the needs and desires of the user. However, the system has demonstrated the ability to rapidly and accurately scale to large corpuses of data with few iterations.

Illustrative Computing Device and Illustrative Operational Environment

Figure 3:
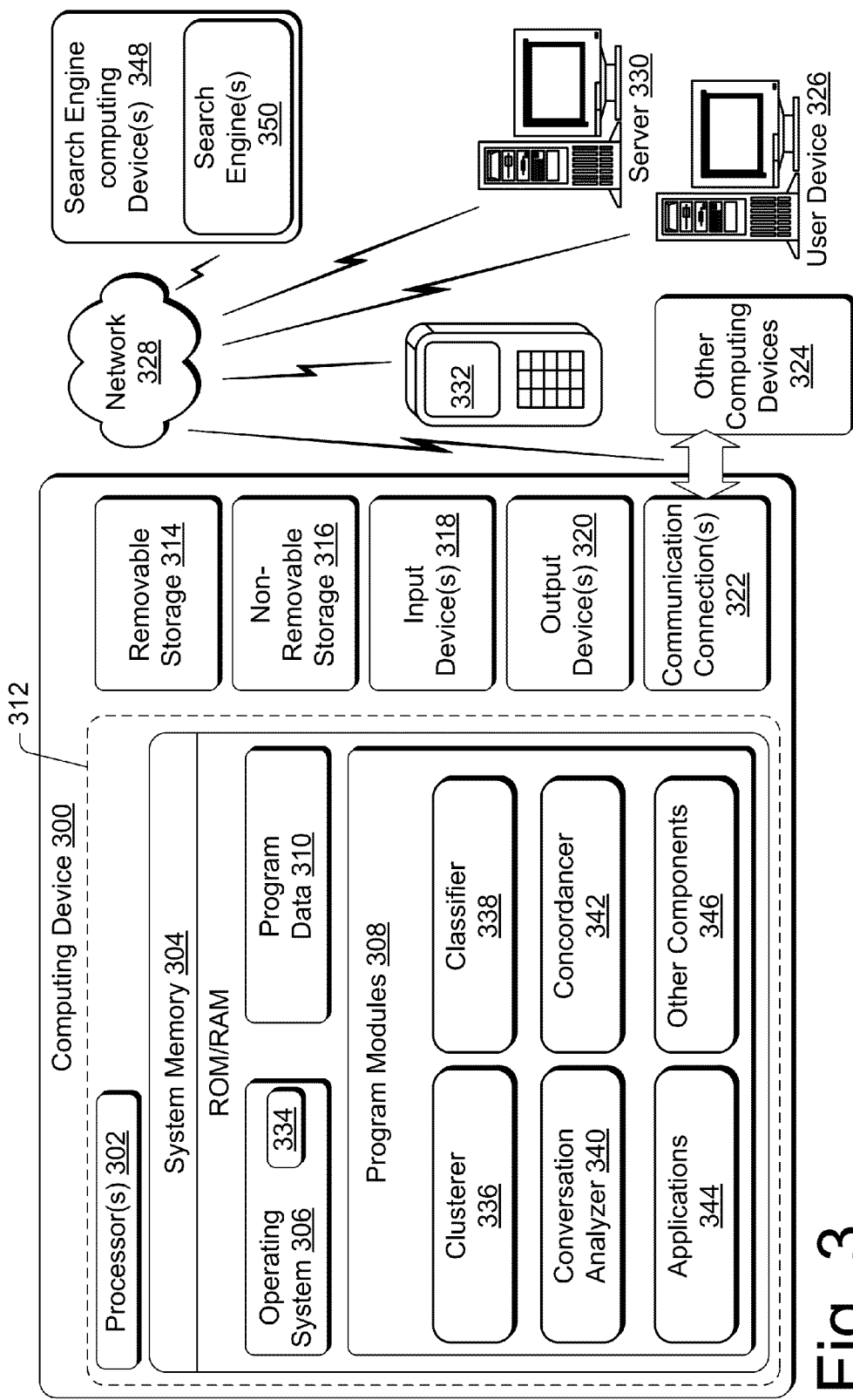
FIG. 3 illustrates an example architecture in which techniques described herein may be implemented.

FIG. 3 illustrates a representative computing device 300 that may, but need not necessarily be used to, implement the system and methods described herein, in accordance with various embodiments. The techniques and mechanisms described herein may be implemented by multiple instances of the computing device 300, as well as by any other computing device, system, and/or environment. The computing device 300 shown in FIG. 3 is only one example of a computing device and is not intended to suggest any limitation as to the scope of use or functionality of any computing device utilized to perform the processes and/or procedures described above.

In at least one configuration, the computing device 300 includes at least one processor 302 and system memory 304. The processor(s) 302 may execute one or more modules and/or processes to cause the computing device 300 to perform a variety of functions. In some embodiments, the processor(s) 302 may include a central processing unit (CPU), a graphics processing unit (GPU), both CPU and GPU, or other processing units or components known in the art. Additionally, each of the processor(s) 302 may possess its own local memory, which also may store program modules, program data, and/or one or more operating systems.

Depending on the exact configuration and type of the computing device 300, the system memory 304 may be volatile (such as RAM), non-volatile (such as ROM, flash memory, miniature hard drive, memory card, or the like) or some combination thereof. The system memory 304 may include an operating system 306, one or more program modules 308, and may include program data 310. The operating system 306 includes a component-based framework 334 that supports components (including properties and events), objects, inheritance, polymorphism, reflection, and provides an object-oriented component-based application programming interface (API). The computing device 300 is of a very basic illustrative configuration demarcated by a dashed line 312. Again, a terminal may have fewer components but may interact with a computing device that may have such a basic configuration.

Program modules 308 may include, but are not limited to, a clusterer 336, a classifier 338, a conversation analyzer 340, a concordancer 342, applications 344, and/or other components 346.

The computing device 300 may have additional features and/or functionality. For example, the computing device 300 may also include additional data storage devices (removable and/or non-removable) such as, for example, magnetic disks, optical disks, or tape. Such additional storage is illustrated in FIG. 3 by removable storage 314 and non-removable storage 316.

The storage devices and any associated computer-readable media may provide storage of computer readable instructions, data structures, program modules, and other data. Computer-readable media includes, at least, two types of computer-readable media, namely computer storage media and communication media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 302, perform various functions and/or operations described herein.

The computing device 300 may also have input device(s) 318 such as a keyboard, a mouse, a pen, a voice input device, a touch input device, etc. Output device(s) 320, such as a display, speakers, a printer, etc. may also be included.

The computing device 300 may also contain communication connections 322 that allow the device to communicate with other computing devices 324, such as over a network. By way of example, and not limitation, communication media and communication connections include wired media such as a wired network or direct-wired connections, and wireless media such as acoustic, radio frequency (RF), infrared, and other wireless media. The communication connections 322 are some examples of communication media. Communication media may typically be embodied by computer readable instructions, data structures, program modules, etc.

FIG. 3 also shows a schematic diagram of an illustrative operating environment where an illustrative system may operate. For example, various embodiments of the system may operate on the computing device 300. The computing device 300 may interact with a user device 326 directly or indirectly. The computing device may be connected to a network 328. The network device 328 may provide access to other computing devices 324 including a server 330, mobile devices 332, and/or other connections and/or resources. Connections may be wired or wireless.

The illustrated computing device 300 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, handheld or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Additionally or alternatively, the computing device 300 may be in communication with one or more search engine computing devices 348 via, for example, network 328.

Communication connection(s) 322 are accessible by processor(s) 302 to communicate data to and from the one or more search engine computing devices 348 over a network, such as network 328. Search engine computing devices 348 may be configured to perform the search using one or more search engines 350. Search engines 350 may be a generic search engine such as Bing®, Google®, or Yahoo®, a combination of search engines, or a custom search engine configured to operate in conjunction with the system 300. Search engines 350 may also be a specialized form of a search engine such as Bing®, Maps, or Google® image search.

It should be understood that system 300 may be used in an environment or in a configuration of specialized computer systems. Examples include a personal computer, a server computer, a handheld device or a portable device, a tablet device, a multi-processor system, a microprocessor-based system, a set-up box, a programmable customer electronic device, a network PC, and a distributed computing environment including any system or device above.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that may be implemented in hardware, software, or a combination of hardware and software. For discussion purposes, the processes are described with reference to the system shown in FIGS. 1-3. However, the processes may be performed using different architectures and devices.

Figure 4:
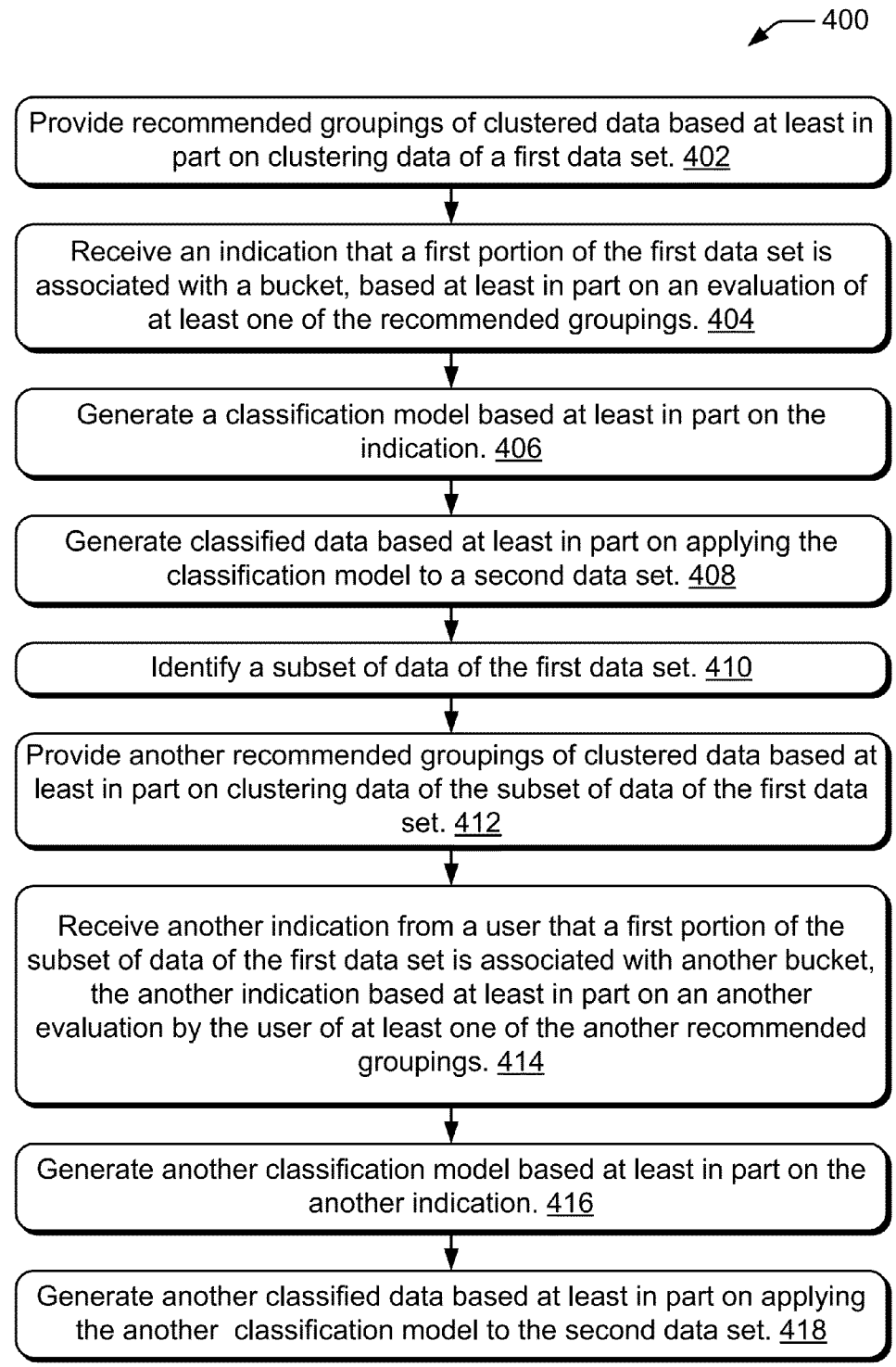
FIG. 4 is a flowchart of an illustrative process for classifying data based on user input and evaluation.

FIG. 4 is a flowchart of an illustrative process 400 of classifying data based on user input and evaluation. For example, at 402, a recommended grouping of clustered data may be provided. The recommended groupings may be based at least in part on clustering data of a first data set.

At 404, an indication may be received from a user that a first portion of the first data set is associated with a bucket. Various embodiments contemplate that the indication may comprise an action by a user, for example the user may drag and drop a representation of the data into a bucket, the user may speak or otherwise gesture indicating the association. Additionally or alternatively, the user may generate a pattern that may cause the first data set is associated with a user. Various embodiments contemplate that the indication may be based at least in part on an evaluation by the user of at least one of the recommended groupings. Various embodiments contemplate that the indication may comprise a selection of one or more inputs affirmatively associated with the bucket. Additionally or alternatively, various embodiments contemplate that the indication may comprise a selection of one or more subunits of one or more inputs affirmatively associated with the bucket. For example, the selection of one or more subunits of the one or more inputs may comprise a pattern identified in the one or more inputs.

At 406, a classification model may be generated. Various embodiments contemplate that the classification model may be based at least in part on the indication.

At 408, the data may be classified generating classified data. Various embodiments contemplate that the classification may be based at least in part on applying the classification model to a second data set. Various embodiments contemplate that at least a portion of the classified data may be associated with the bucket.

At 410, a subset of data of the first data set may be identified.

At 412, another recommended grouping of clustered data may be provided. Various embodiments contemplate that the other recommended groupings may be based at least in part on clustering data of the subset of data of the first data set.

At 414, another indication may be received from a user a first portion of the subset of data of the first data set is associated with another bucket. Various embodiments contemplate that the other indication may be based at least in part on an another evaluation by the user of at least one of the another recommended groupings.

At 416, another classification model may be generated. Various embodiments contemplate that the other classification model may be based at least in part on the another indication.

At 418, another classified data may be generated. Various embodiments contemplate that the other classified data may be based at least in part on applying the another classification model to the second data set.

Figure 5:
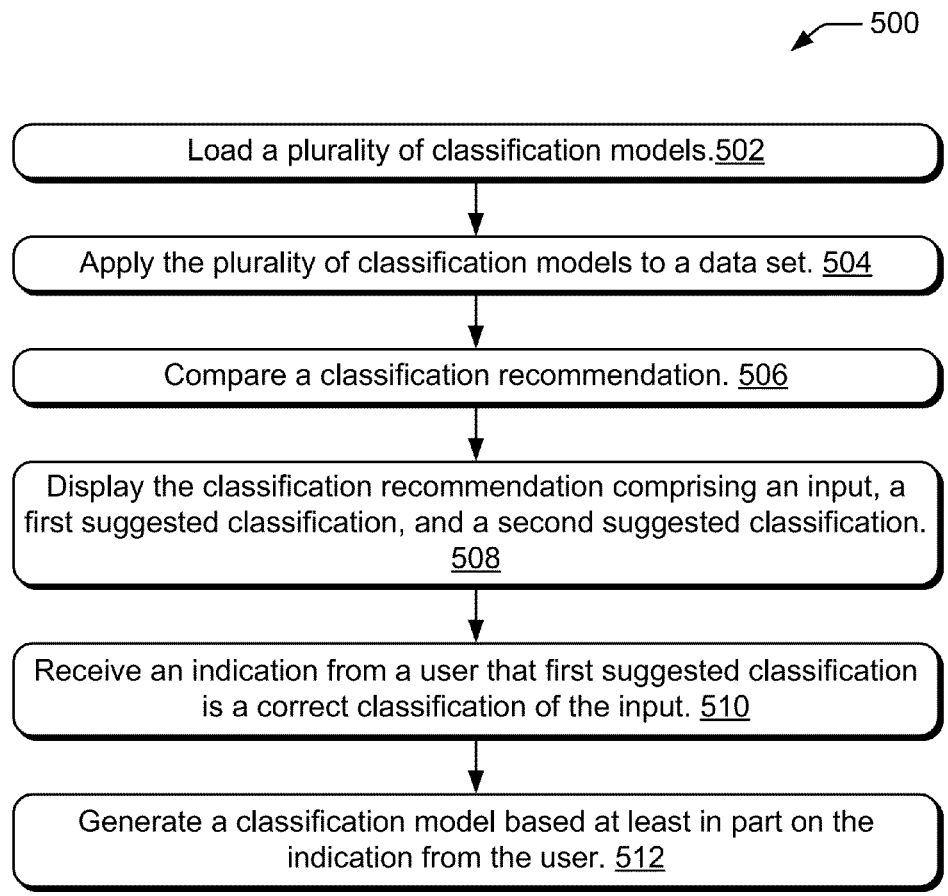
FIG. 5 is a flowchart of an illustrative process for comparing classification models.

FIG. 5 is a flowchart of an illustrative process 500 of comparing classification models. For example, at 502, a plurality of classification models may be loaded.

At 504, the plurality of classification models may be applied to a data set.

At 506 a classification recommendation may be evaluated. For example, the classification may compare the results of the plurality of classification models applied to the data set. Various embodiments contemplate that the classification recommendation may be based at least in part on the plurality of classification models. Various embodiments contemplate that the classification recommendation may further comprise a first confidence associated with the first suggested classification, and a second confidence associated with the second suggested classification.

At 508, the classification recommendation may be displayed. Various embodiments contemplate that the classification recommendation may comprise an input, a first suggested classification, and a second suggested classification. Additionally or alternatively, various embodiments contemplate display the classification recommendations at runtime where a clarification question may be displayed seeking input from a user to clarify or select an answer to a question or otherwise resolve a different between two or more classification models.

At 510, an indication may be received from a user that first suggested classification is a correct classification of the input. Various embodiments contemplate that the indication may be based at least in part on an evaluation by the user of at least a portion of the classification recommendation. Additionally or alternatively, various embodiments contemplate that the indication may comprise a selection of one or more subunits of one or more inputs affirmatively associated with the bucket. For example, the selection of one or more subunits of the one or more inputs may comprise a pattern identified in the one or more inputs.

At 512, a classification model may be generated based at least in part on the indication from the user.

Figure 6:
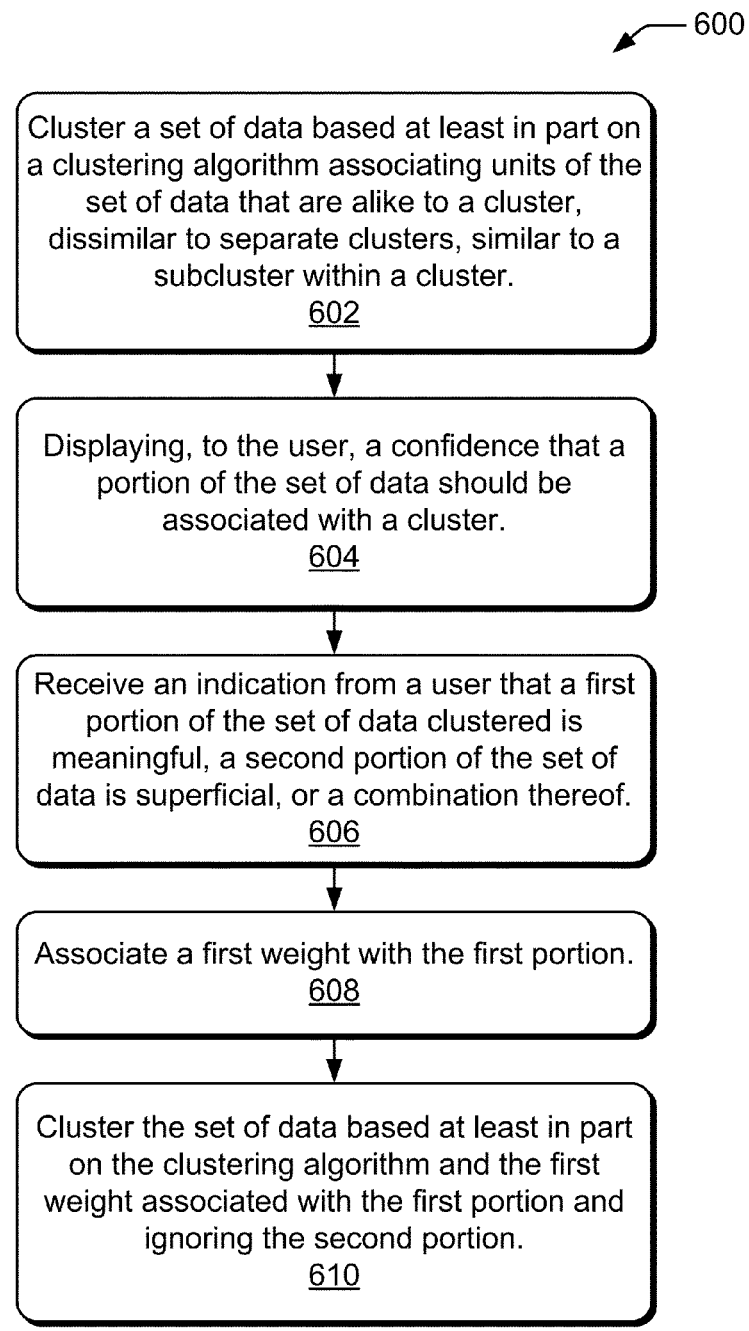
FIG. 6 is a flowchart of an illustrative process for associating data based at least in part on a user's indication.

FIG. 6 is a flowchart of an illustrative process 600 of associating data based at least in part on a user's indication. For example, at 602, a clustering module may cluster a set of data based at least in part on a clustering algorithm. Various embodiments contemplate that the clustering algorithm may associate units of the set of data that are alike to a cluster. For example, a similarity threshold may be set and if a confidence factor meets or exceeds the similarity threshold, then the clustering algorithm may associate the units as alike.

Additionally or alternatively, the clustering algorithm may associate units of the set of data that are dissimilar to separate clusters. For example, a dissimilarity threshold may be set and if a confidence factor is below the dissimilarity threshold, then the clustering algorithm may associate the units with separate clusters.

Additionally or alternatively, the clustering algorithm may associate units of the set of data that are similar to subclusters within a cluster. For example, if a confidence factor is between a low and high threshold range, the units may be associated with a subcluster within a cluster.

Additionally or alternatively, the clustering algorithm may ignore a portion of the data set based at least in part on a subject context. For example, the context of the data may cause certain features to regularly appear in the data, however, the certain features do not aid in clustering, comparing, and/or contrasting the data. For example, in the context of a natural language setting, an organizational name may appear, but does not help to distinguish different intents of users. For example, Gonzaga may be removed as a stop word as part of a Gonzaga University database.

At 604, a display may display, to a user, a confidence that a portion of the set of data should be associated with a cluster. Various embodiments contemplate that the confidence may be based at least in part on a model, for example, a statistical model.

At 606, a receiver module may receive an indication from a user that a first portion of the set of data clustered is meaningful, a second portion of the set of data is superficial, or a combination thereof. Various embodiments contemplate that the meaningful indication and superficial indication may be based at least in part on a human cognitive trigger.

Various embodiments contemplate that the indication that the first portion is meaningful may comprise selecting the first portion, highlighting the first portion, underlining the first portion, checking one or more boxes associated with the first portion, un-checking one or more boxes associated with the first portion touching the first portion, speaking the first portion, typing the first portion, or a combination thereof.

Various embodiments contemplate that the indication that the second portion is superficial may comprise selecting the second portion, crossing out the second portion, highlighting the second portion, underlining the second portion, checking one or more boxes associated with the second portion, un-checking one or more boxes associated with the second portion touching the second portion, speaking the second portion, typing the second portion, or a combination thereof.

At 608, an associating module may associate a first weight with the first portion;

At 610, the clustering module may cluster the set of data based at least in part on the clustering algorithm and the first weight associated with the first portion and ignoring the second portion. Various embodiments contemplate that the clustering algorithm may be based at least in part on a human trained algorithm. For example, human trained may include regression testing, adding to the model by a human, modifying the model by a human, or combinations thereof. Additionally or alternatively, the modifying of a model by a human may comprise the human directing specific data to be associated with a group. Various embodiments contemplate that the direction of specific data may comprise indicating that a portion of existing data is to be associated with a given group and/or bucket, creating a classification that causes a portion of existing data to be associated with the given group and/or bucket, creating examples of data that are to be associated with the given group and/or bucket without specifically referencing existing data, or combinations thereof.

Additionally or alternatively, various embodiments contemplate that the set of data may comprise words, phrases, sentence fragments, sentences, documents, photos, images, DNA sequences, sounds, gestures, databases, language models, files, waves, mathematical patterns, equations, colors, tastes, touches, haptic feedback, temperatures, models, medical histories, test results, symptoms, disease states, drug treatments, behavioral patterns, handwriting patterns, languages, tomes, writing styles, scents, smells, writing styles, human motion (gait, walking patterns, gestures), animal motions, plant motions, microbe motions, muscle motions (heart palpitations), voices, eyes, finger prints, identifications, or combinations thereof.

Figure 7:
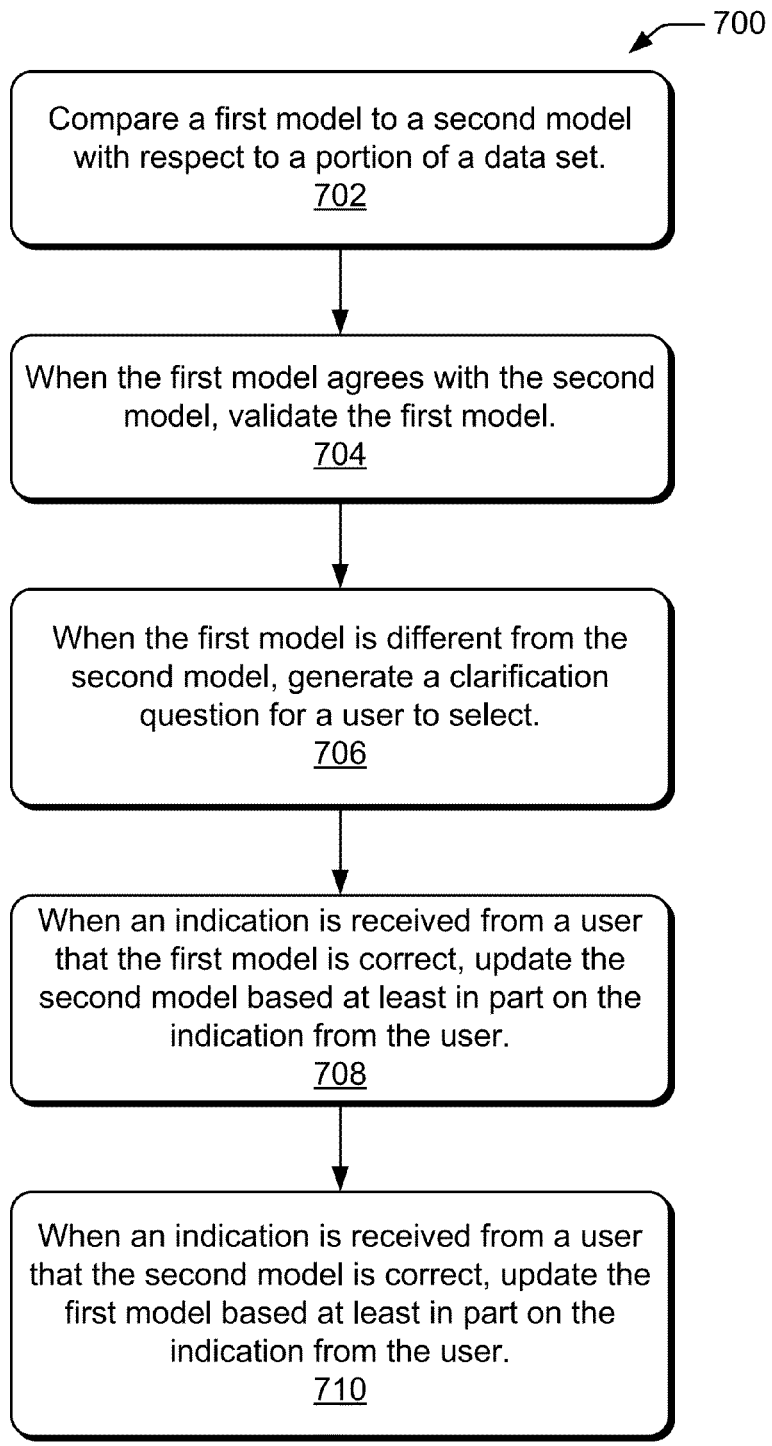
FIG. 7 is a flowchart of an illustrative process for comparing classification models.

FIG. 7 is a flowchart of an illustrative process 700 of comparing classification models. For example, at 702, a first model may be compared to a second model with respect to a portion of a data set. Various embodiments contemplate that the comparing may comprise comparing test results from the first model and the second model of a test set of input data.

At 704, when the first model agrees with the second model, the first model may be validated.

At 706, when the first model is different from the second model, a clarification question for a user to select may be generated. Various embodiments contemplate that the clarification question may comprise a question asking a user to select an appropriate answer to an input statement.

At 708, when an indication is received from a user that the first model is correct, the second model may be updated based at least in part on the indication from the user. Additionally or alternatively, the indication may be used to set criteria when integrating the first and or second model into a third model, for example, a bucket model.

At 710, when an indication is received from a user that the second model is correct, the first model may be updated based at least in part on the indication from the user. Additionally or alternatively, the indication may be used to set criteria when integrating the first and or second model into a third model, for example, a bucket model.

Additionally or alternatively, various embodiments contemplate that the first model may comprise a symbolic language model and/or a statistical model, while the second model may comprise a symbolic language and/or a statistical language model.

Figure 8:
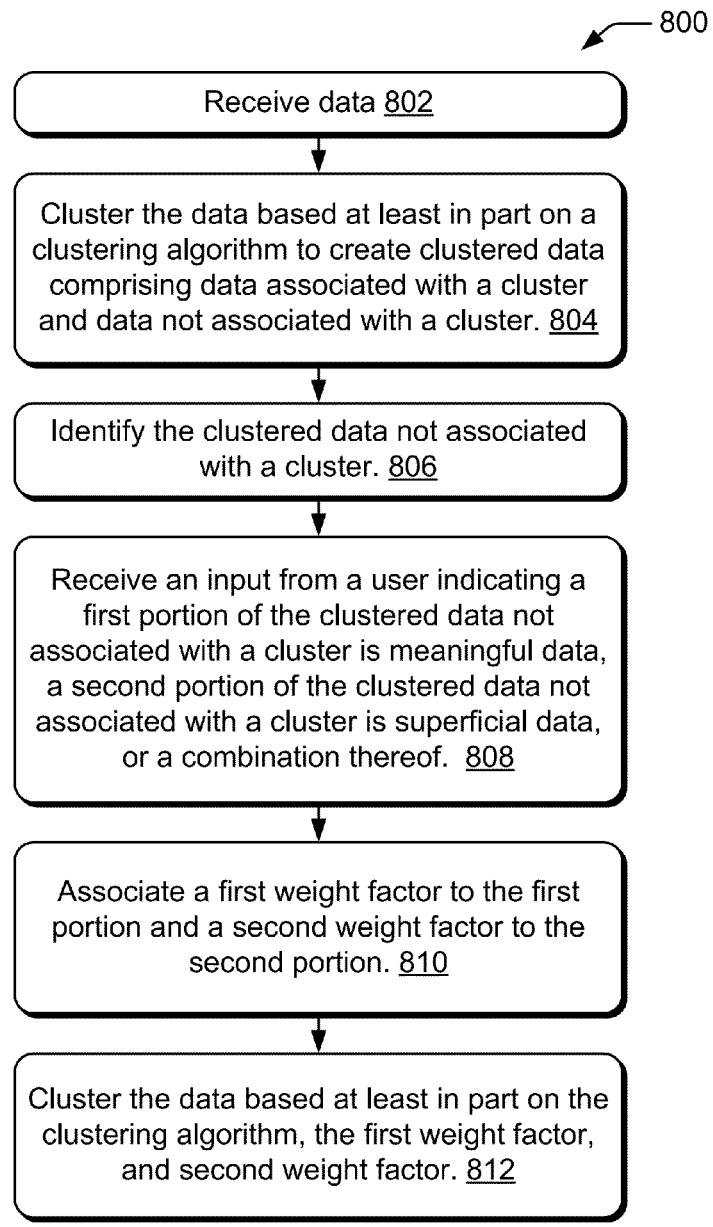
FIGS. 8 and 9 are flowcharts of illustrative processes for associating data based at least in part on a user's indication.

FIG. 8 is a flowchart of an illustrative process 800 of associating data based at least in part on a user's indication. For example, at 802, data may be received. Various embodiments contemplate that the data may be formatted, unformatted, structured, unstructured, or combinations thereof.

At 804, the data may be clustered based at least in part on a clustering algorithm to create clustered data comprising data associated with a cluster and data not associated with a cluster.

At 806, the clustered data not associated with a cluster may be identified.

At 808, an input from a user may be received. The input may indicate that a first portion of the clustered data not associated with a cluster is meaningful data, a second portion of the clustered data not associated with a cluster is superficial data, or a combination thereof. Various embodiments contemplate that the user may comprise a human, and advisor, a quality controller, a proofer, a validator, or combinations thereof.

Various embodiments contemplate that the indication that the first portion is meaningful may comprise selecting the first portion, highlighting the first portion, underlining the first portion, checking one or more boxes associated with the first portion, un-checking one or more boxes associated with the first portion touching the first portion, speaking the first portion, typing the first portion, or a combination thereof.

Additionally or alternatively, various embodiments contemplate that the indication that the second portion is superficial comprises selecting the second portion, crossing out the second portion, highlighting the second portion, underlining the second portion, checking one or more boxes associated with the second portion, un-checking one or more boxes associated with the second portion touching the second portion, speaking the second portion, typing the second portion, or a combination thereof.

At 810, a first weight factor may be associated with the first portion and a second weight factor associated with the second portion. Various embodiments contemplate that the first weight factor is greater than the second weight factor. Additionally or alternatively, various embodiments contemplate that the first weight factor is greater than the second weight factor, and the second weight factor is zero.

At 812, the data may be clustered based at least in part on the clustering algorithm, the first weight factor, and second weight factor.

Various embodiments contemplate that the data may comprise words, phrases, sentence fragments, sentences, documents, photos, images, DNA sequences, sounds, gestures, databases, language models, files, waves, mathematical patterns, equations, colors, tastes, touches, haptic feedback, temperatures, models, medical histories, test results, symptoms, disease states, drug treatments, behavioral patterns, handwriting patterns, languages, tomes, writing styles, scents, smells, writing styles, human motion (gait, walking patterns, gestures), animal motions, plant motions, microbe motions, muscle motions (heart palpitations), voices, eyes, finger prints, identifications, or combinations thereof.

Figure 9:
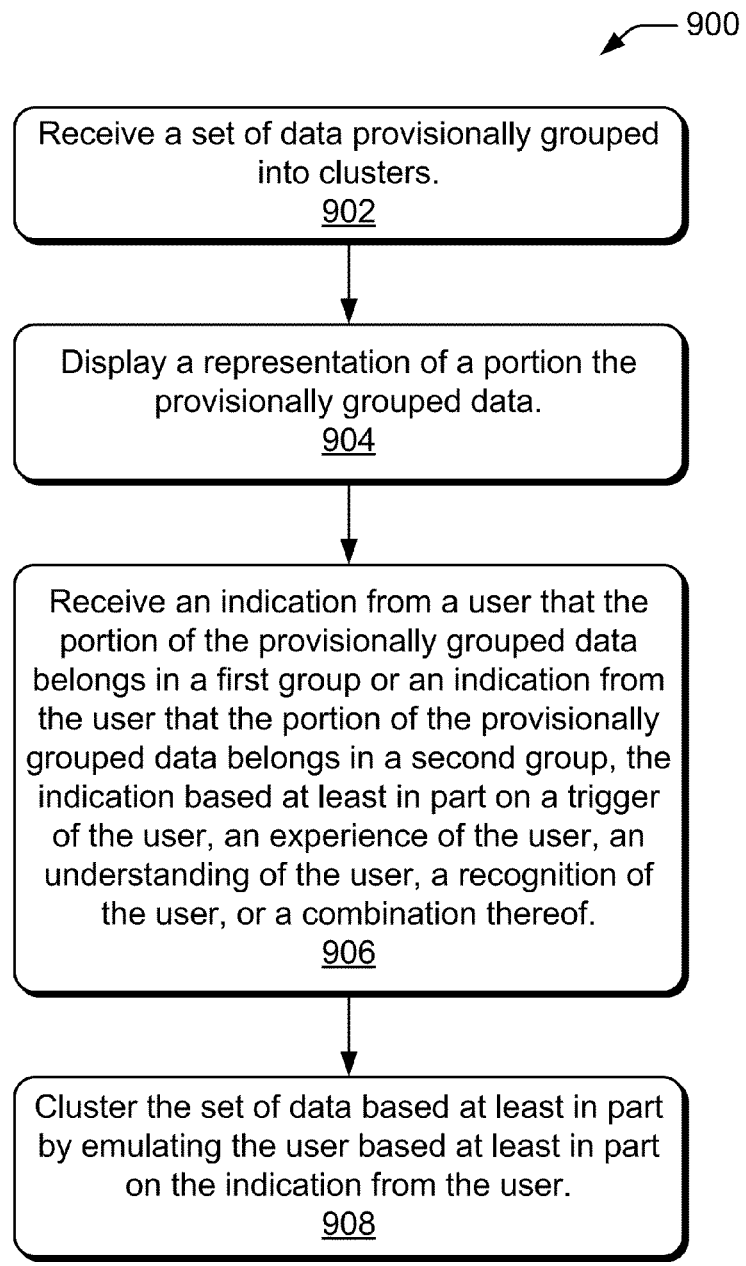

FIG. 9 is a flowchart of an illustrative process 900 of associating data based at least in part on a user's indication. For example, at 902, a set of data provisionally grouped into clusters may be received.

At 904, a representation of a portion the provisionally grouped data may be displayed.

At 906, an indication may be received from a user that the portion of the provisionally grouped data belongs in a first group or an indication from the user that the portion of the provisionally grouped data belongs in a second group. Various embodiments contemplate that the indication may based at least in part on a trigger of the user, an experience of the user, an understanding of the user, a recognition of the user, or a combination thereof. 1. Various embodiments contemplate that the indication from a user may comprise an indication that the portion of the provisionally grouped data belongs in a subgroup of the first group or second group, where, for example, the subgroup not the same as one of the clusters.

At 908, the set of data may be clustered based at least in part by emulating the user. Various embodiments contemplate emulating the user is based at least in part on the indication from the user. For example, the indication from the user may be extrapolated and applied to additional data to associate portions of the additional data to an appropriate cluster.

Figure 10:
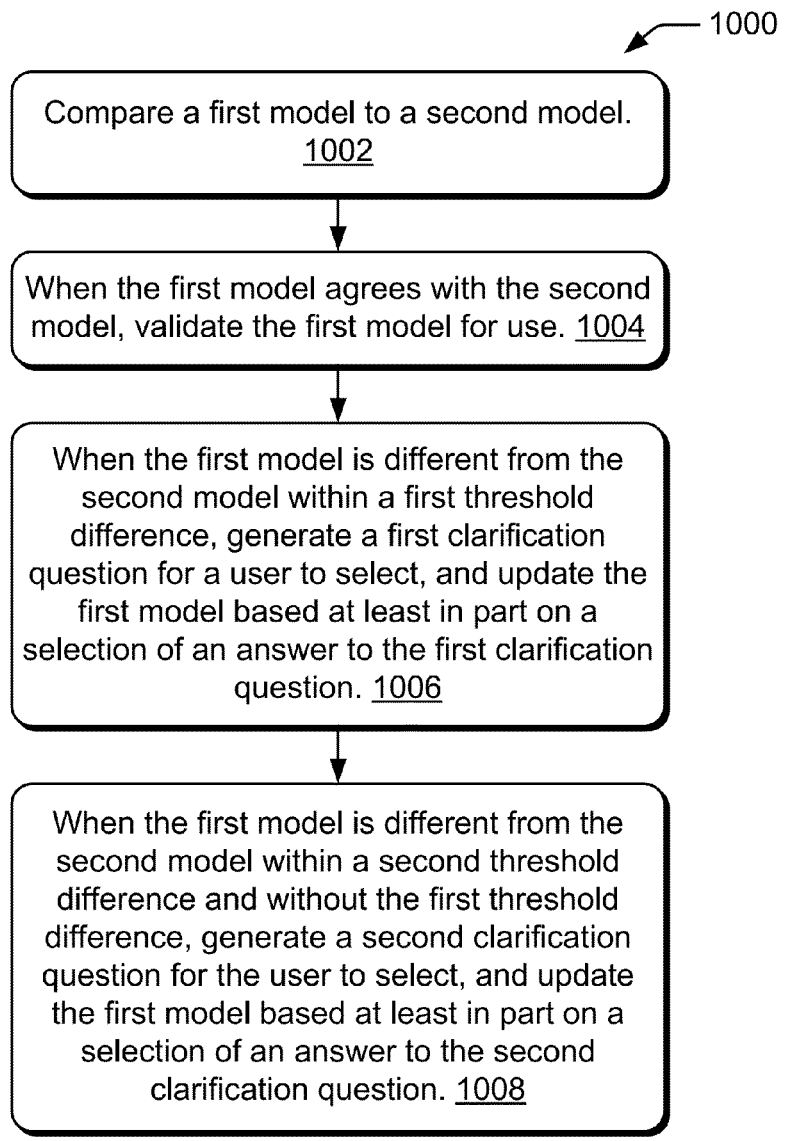
FIGS. 10 and 11 are flowcharts of illustrative processes for comparing classification models.

FIG. 10 is a flowchart of an illustrative process 1000 of comparing classification models. For example, at 1002, a first model may be compared to a second model. Various embodiments contemplate that the comparing may comprise comparing test results from the first model and the second model of a test set of input data.

At 1004, when the first model agrees with the second model, the first model may be validated for use. Additionally or alternatively, various embodiments contemplate that either or both of the models may be validated when both models agree. Various embodiments contemplate that the agreement of the first model with the second model may comprise a first score associated with the first model and a second score associated with the second model being within a threshold range.

At 1006, when the first model is different from the second model within a first threshold difference, a first clarification question for a user to select may be generated, and the first model may be updated based at least in part on a selection of an answer to the first clarification question. Various embodiments contemplate that the first clarification question may comprise a question asking a user to select an appropriate answer to an input statement.

At 1008, when the first model is different from the second model within a second threshold difference and without the first threshold difference, a second clarification question for the user to select may be generated, and the first model may be updated based at least in part on a selection of an answer to the second clarification question. Various embodiments contemplate that the second clarification question may comprise a question asking a user to select an appropriate restatement of an input statement, the appropriate restatement of the input being a leading and/or clarified restatement of the input statement.

Additionally or alternatively, various embodiments contemplate that the first model comprises a symbolic language model, and the second model comprises a statistical language model. Additionally or alternatively, various embodiments contemplate that the first and second models comprise symbolic languages. Additionally or alternatively, various embodiments contemplate that the first and second models comprise statistical models.

Figure 11:
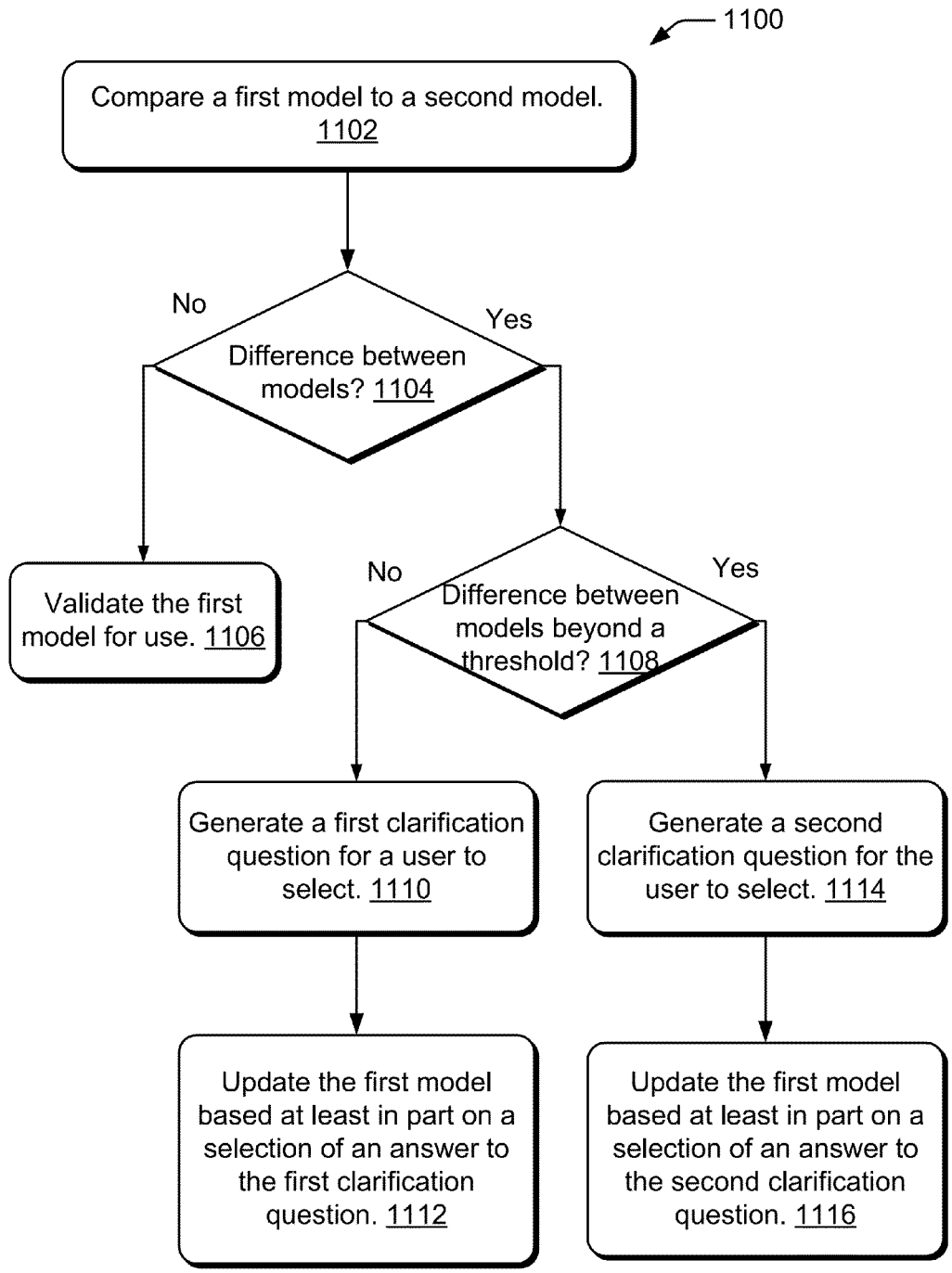

FIG. 11 is a flowchart of an illustrative process 1100 of comparing classification models. For example, at 1102, a first model may be compared to a second model. Various embodiments contemplate that the comparing may comprise comparing test results from the first model and the second model of a test set of input data.

At 1104, the system may determine whether a difference exists between the models. If a difference does not exist, then at 1106, the first model may be validated for use. Additionally or alternatively, various embodiments contemplate that either or both of the models may be validated when both models agree. Various embodiments contemplate that the agreement of the first model with the second model may comprise a first score associated with the first model and a second score associated with the second model being within a threshold range.

At 1104, if a difference does exist, then at 1108 the difference between the models is compared to a threshold.

At 1108, if the difference is not beyond the threshold, then at 1110, a first clarification question may be generated for a user to select. Various embodiments contemplate that the first clarification question may comprise a question asking a user to select an appropriate answer to an input statement.

At 1112, the first model may be updated based at least in part on a selection of an answer to the first clarification question.

At 1108, if the difference is beyond a threshold, then at 1114, a second clarification question may be generated for the user to select. Various embodiments contemplate that the second clarification question may comprise a question asking a user to select an appropriate restatement of an input statement, the appropriate restatement of the input being a leading and/or clarified restatement of the input statement.

At 1116, the first model may be updated based at least in part on a selection of an answer to the second clarification question.

Additionally or alternatively, various embodiments contemplate that the first model comprises a symbolic language model, and the second model comprises a statistical language model. Additionally or alternatively, various embodiments contemplate that the first and second models comprise symbolic languages. Additionally or alternatively, various embodiments contemplate that the first and second models comprise statistical models.

Figure 12:
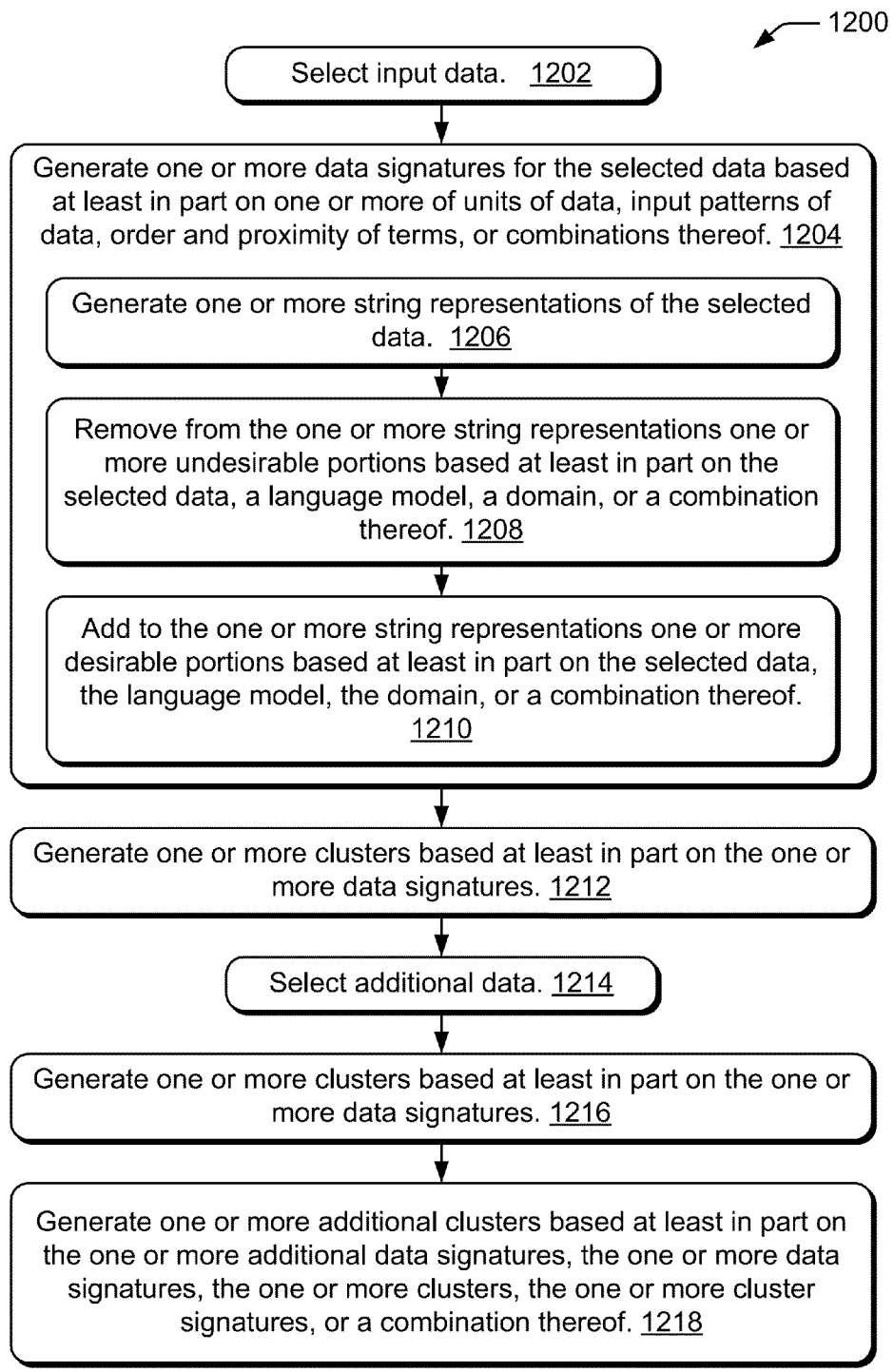
FIG. 12 is a flowchart of an illustrative process where clusters are generated using data signatures.

FIG. 12 is a flowchart of an illustrative process 1200 where clusters are generated using data signatures. For example, at 1202, input data may be selected. Various embodiments contemplate that the input data may be formatted, partially formatted, unformatted, or combinations thereof. Additionally or alternatively, the input data may be structured, partially structured, unstructured, or combinations thereof. Additionally or alternatively, the input data may be filtered, partially filtered, unfiltered, or combinations thereof.

At 1204, one or more data signatures may be generated for the selected data. For example, the data signatures may comprise signature strings. Various embodiments contemplate that the data signatures may be based at least in part on one or more of units of data, input patterns of data, order and proximity of terms, or combinations thereof.

Various embodiments contemplate that the generating the one or more data signatures may comprise several features. For example, at 1206, one or more string representations of the selected data may be generated.

At 1208, one or more undesirable portions may be removed from the one or more string representations based at least in part on the selected data, a language model, a domain, or a combination thereof. For example, stop words may be removed from a string representation.

At 1210, one or more desirable portions may be added to the one or more string representations based at least in part on the selected data, the language model, the domain, or a combination thereof. For example, metaphones, bigrams, trigrams, or others of words or phrases of the data may be added to increase the effectiveness of the clustering. Additionally or alternatively, various embodiments contemplate leveraging mapping as well. For example, various specific terms may be related to a more generalized term, where the more generalized term may be substituted each time one of the various specific terms is found.

At 1212, one or more clusters may be generated based at least in part on the one or more data signatures. Various embodiments contemplate that concepts, and in some cases, intents, may be identified based at least in part on the generated clusters. Various embodiments contemplate that the one or more clusters may comprise structured data comprising one or more cluster signatures comprising a string associated with an original portion of selected data. Various embodiments contemplate that the one or more clusters may further comprise a link to the original portion of selected data. Various embodiments contemplate that linking to the original portion of selected data may be beneficial for post processing and inspection. For example, it may be beneficial to review the underlying original data when examining clusters.

At 1214, additional data may be selected. Various embodiments contemplate that the additional data may be related or unrelated to the input data selected at 1202. Additionally or alternatively the amount of additional data selected may be larger or smaller than the size of the input data selected at 1202.

At 1216, one or more additional data signatures may be generated for the selected additional data.

At 1218, one or more additional clusters may be generated based at least in part on the one or more additional data signatures, the one or more data signatures, the one or more clusters, the one or more cluster signatures, or a combination thereof.

Various embodiments contemplate additional clustering approaches. For example, selected data may be clustered based at least in part on one or more data signatures. Various embodiments contemplate that clustering may comprise distributing portions of the selected data to one or more clustering nodes. Various embodiments contemplate that the portions of the selected data may be in the form of data signatures. Additionally or alternatively, various embodiments contemplate that the clustering may further comprise receiving clustered data from the one or more clustering nodes. For example, the clustered data may comprise a reduced data set representative of the distributed selected data to the one or more clustering nodes. Various embodiments contemplate that the clustered data may represent a statistical representation of the clustered data. For example, the reduced data set may comprise one or more cluster signatures associated with a portion of the distributed selected data.

Additionally or alternatively, various embodiments contemplate that the clustering may further comprise distributing portions of the received clustered data to the one or more clustering nodes. Various embodiments contemplate that the data distributed may further comprise portions of selected data not previously clustered. Additionally or alternatively, various embodiments contemplate that the clustering may further comprise receiving clustered data from the one or more clustering nodes. Additionally or alternatively, various embodiments contemplate that the clustering may further comprise repeating the distributing and receiving until a threshold is met, threshold comprising one or more of a number of clusters created, a number of iterations performed, or a combination thereof.

Additionally or alternatively, various embodiments contemplate receiving an indication from a user that a first portion of the clustered data associated with a first cluster is inaccurate, the indication comprising an indication that a first portion of a unit of the selected data is meaningful, and a second portion of the unit of the selected data is superficial. A first weight may be assigned to the first portion.

Additionally or alternatively, various embodiments contemplate distributing portions of the received clustered data with the first weight to the one or more clustering nodes and receiving clustered data from the one or more clustering nodes. Additionally or alternatively, various embodiments contemplate repeating the distributing and receiving until a threshold is met, threshold comprising one or more of a number of clusters created, a number of iterations performed, or a combination thereof.

Additionally or alternatively, various embodiments contemplate receiving an indication from a user that a first portion of the clustered data associated with a first cluster is inaccurate, the indication comprising affirmatively associating the first portion of the clustered data a second cluster. Various embodiments contemplate updating and/or recreating one or more data signatures associated with the first cluster and one or more data signatures associated with the second cluster. Additionally or alternatively, various embodiments contemplate adjusting the underlying data to capture correction of the association.

Various embodiments contemplate additional grouping and/or bucketing approaches. For example, one or more buckets may be defined. For example, the one or more buckets may comprise one or more bucket patterns based at least in part on one or more cluster patterns, input data patterns, or a combination thereof. Various embodiments contemplate that the defining of one or more buckets may further comprise receiving an input data pattern from a user. The data pattern may be generated in situ by the user or selected from a database.

Various embodiments contemplate that the one or more buckets may comprise a bucket hierarchy. For example, the bucket hierarchy may comprise one or more parent buckets with one or more child buckets associated within a parent bucket of the one or more parent buckets. Additionally or alternatively, the bucket hierarchy may comprise one or more buckets with one or more sub-buckets associated within a bucket of the one or more buckets where the bucket hierarchy may comprise one or more sub-sub-buckets associated within a sub-bucket of the one or more sub-buckets.

Various embodiments contemplate selecting input data. Various embodiments contemplate that the data may be formatted, partially formatted, unformatted, or combinations thereof. Additionally or alternatively, the data may be structured, partially structured, unstructured, or combinations thereof. Additionally or alternatively, the data may be filtered, partially filtered, unfiltered, or combinations thereof.

Various embodiments contemplate defining one or more data signatures based at least in part on the selected input data.

Various embodiments contemplate associating a portion of the selected input data with the one or more buckets based at least in part on comparing a data signature of the one or more data signatures to a bucket pattern of the one or more bucket patterns.

Additionally or alternatively, various embodiments contemplate generating a bucket model that may comprise an evaluation of the input data associated with a matched bucket. For example, the bucket model may comprise a statistical model representing an accuracy of the input data associated with the matched bucket, the statistical model based at least in part on bucket patterns, input data patterns, or combinations thereof.

Additionally or alternatively, various embodiments contemplate suggesting a bucket for an unassigned input data based at least in part on the bucket model.

Various embodiments contemplate additional clustering, grouping, and/or bucketing approaches. Various embodiments contemplate receiving a request to generate buckets.

Additionally or alternatively, various embodiments contemplate generating buckets based at least in part on one or more bucket patterns based at least in part on one or more cluster patterns, for example, cluster signatures, input data patterns, or a combination thereof.

Additionally or alternatively, various embodiments contemplate assigning selected input data to the buckets based at least in part on the one or more bucket patterns, input data patterns, or combinations thereof.

Additionally or alternatively, various embodiments contemplate displaying, on a display, one or more views comprising and unassigned list view, an auto-cluster view, a suggested buckets view, or combinations thereof.

Additionally or alternatively, various embodiments contemplate displaying, on a display, a graphical representation indicating a relative size of a bucket with respect to another bucket of the buckets. For example, the display may take the form of a heat map, a bucket hierarchy, or combinations thereof, among others.

Additionally or alternatively, various embodiments contemplate generating a bucket model based at least in part on a statistical model representing an accuracy of the selected input data associated with an assigned bucket, the statistical model based at least in part on bucket patterns, input data patterns, or combinations thereof.

Additionally or alternatively, various embodiments contemplate displaying, on a display, bucket accuracy indicators, the bucket accuracy indicators comprising a best match, a best match to another bucket in a bucket hierarchy, a lack of a best match, no match, or a combination thereof.

Additionally or alternatively, various embodiments contemplate receiving an indication from a user that a first input data pattern associated with a first bucket should be associated with a second bucket. Additionally or alternatively, various embodiments contemplate updating one or more bucket patterns associated with the first bucket and one or more bucket patterns associated with the second bucket.

Additionally or alternatively, various embodiments contemplate testing the bucket model with example test input data.

Illustrative Features and Interfaces

Various embodiments contemplate allowing users to analyze large amounts of data. For example, a user, in a first instance, may readily and rapidly determine what data is alike and what data is different with respect to a first set of criteria or first view point. Additionally, the user, in a second instance, may readily and rapidly determine what data is alike and what data is different with respect to a second set of criteria or second view point. In these examples, the user may use the same data in the first and second instances, or may use subsets of the data in each or either instance.

For example, various embodiments contemplate helping the user to understand how a set of inputs relate to each other. Various embodiments contemplate grouping certain inputs into groups, for example, buckets, of similar characteristics. For example, a set of natural language inputs may be grouped into buckets of similar intents.

Various embodiments contemplate allowing a user to view and/or analyze data in an aggregate form. While data may still be analyzed one by one in various embodiments, viewing and/or analyzing the data in an aggregated form may provide additional efficiency in analyzing and/or understanding the data. For example, this may allow a user to approach the data and identify any problem areas represented by the data from a holistic approach and may further allow a strategic approach to refine or resolve the identified problems. For example, in a natural language setting, a user analyzing a large dataset of conversations from a helpline call or chat may holistically identify problem areas of the underlying service and allow the user to strategically address those areas identified, for example, by addressing the most frequent problems first.

Additionally or alternatively, various embodiments contemplate providing groupings based on recommended groupings of input data based in part on clustering methods, for example, agglomerative clustering; providing groupings based on human emulating grouping methods, for example, leveraging user input providing one or more example groupings, or combinations thereof.

Various embodiments contemplate providing various structures to accommodate disparate datasets. For example, a first dataset may be related to a first customer while a second data set may be related to a second customer. Additionally or alternatively, a third dataset may contain a first type of data, for example, natural language data, while a fourth dataset may contain a second type of data, for example, video.

Various embodiments contemplate data may include, but is not limited to, the set of data comprises words, phrases, sentence fragments, sentences, documents, photos, images, DNA sequences, sounds, gestures, databases, language models, files, waves, mathematical patterns, equations, colors, tastes, touches, haptic feedback, temperatures, models, medical histories, test results, symptoms, disease states, drug treatments, behavioral patterns, handwriting patterns, languages, tomes, writing styles, scents, smells, writing styles, human motion (gait, walking patterns, gestures), animal motions, plant motions, microbe motions, muscle motions (heart palpitations), voices, eyes, finger prints, identifications, or combinations thereof.

Additionally or alternatively, various embodiments contemplate providing control features to allow or prevent accessing various datasets. For example, a first user may have permissions to access a first and second customer's datasets, but not a third customer's dataset, while a second user may have permission to access the second customer's dataset only.

Figures 13A, 13B:
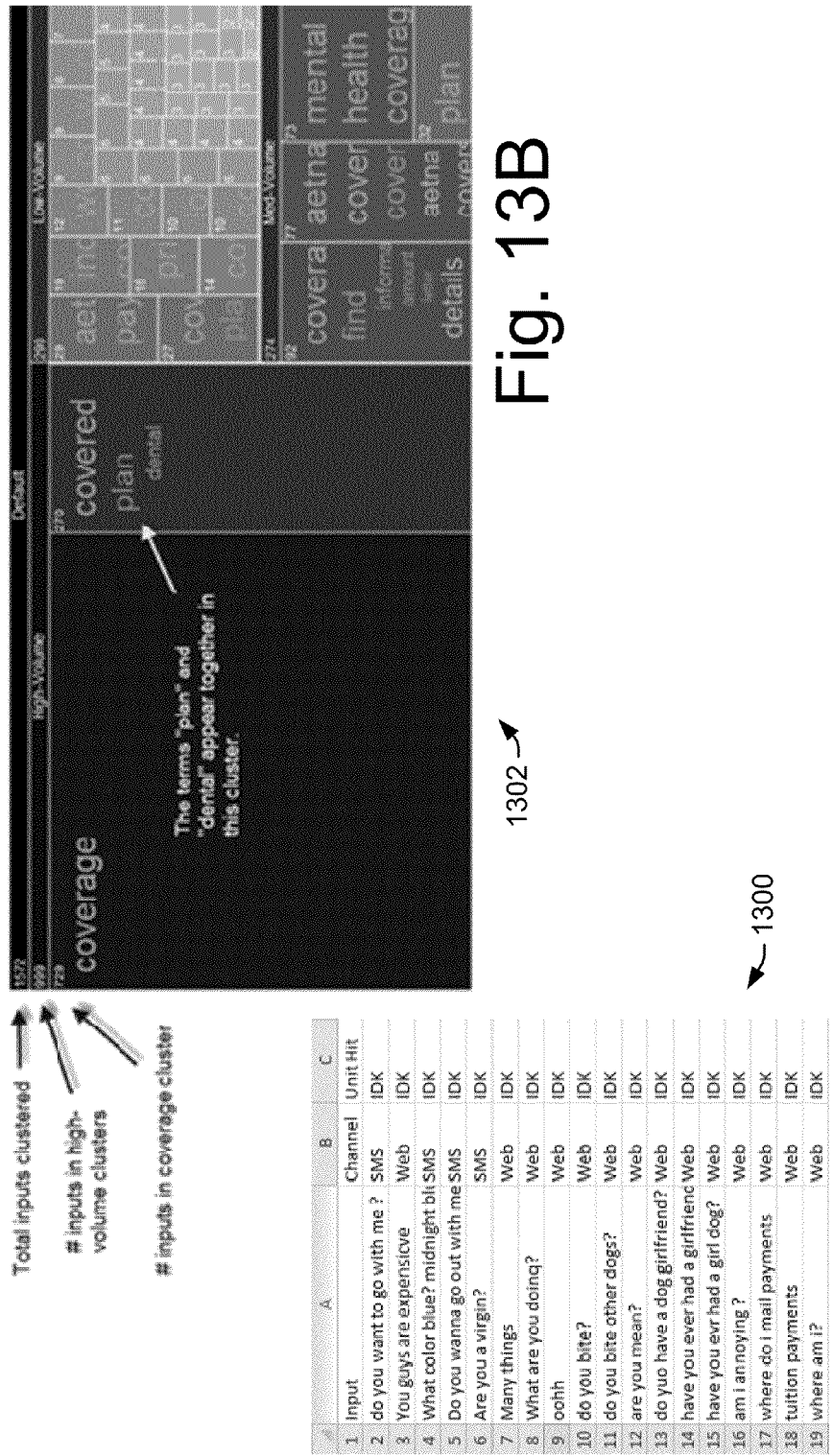

Various embodiments contemplate importing various types of data. For example, FIG. 13A shows an example of data 1300 in the form of sentences to be imported.

Additionally or alternatively, various embodiments contemplate importing data in various forms. For example, the data to be imported may be structured, unstructured, partially structured, or combinations thereof. For example, a dataset may comprise multiple pieces of data related to each other. For example, a spreadsheet may comprise three columns of data where each row may not be in any particular order, but within each row, the column data may be related. Additionally or alternatively, the data may have some grouping information included. Continuing with the preceding example of spreadsheet data, the data may specify that the first 10 rows are grouped together, while rows 11, 15, and 20-32 are grouped together. Additionally or alternatively, the data may have some hierarchal information included. Continuing with the preceding example of grouped spreadsheet data, the data may specify that rows 4-6 are a subset group of the group comprising rows 1-3 and 7-10, as well as rows 35-56 are a subset group of the group comprising rows 11, 15, and 20-32.

Various embodiments contemplate importing FPML data while preserving or leveraging information contained in the FPML data.

Additionally or alternatively, certain data may be imported while other is not. For example, only certain data may be imported while other data is not. For example, if importing from a spreadsheet, only columns A, B, and D or imported. Additionally or alternatively, filters may be applied to limit importation. For example, a filter may be applied to exclude units from importation. Additionally or alternatively, a filter may be applied to only import units that match a designated pattern.

Various embodiments contemplate providing various views of the data. For example, an Unassigned List View where inputs in a dataset that have not been grouped and/or bucketed are displayed; an Auto-Cluster View where inputs in the dataset may be grouped by key words and/or ideas in the set are displayed; a Suggested Buckets View where inputs in the dataset may be grouped by suggested bucket based on a classifier model; a List Search Results where the last search that the user performed is displayed; a Pattern Search Results where the last pattern that the user ran is displayed.

Various embodiments contemplate applying filters to the displayed data. For example, a filter may be created by a user based on a user's criteria. For example, a user may set multiple criteria in a single filter. Additionally or alternatively, various embodiments contemplate applying one or more filters to vary levels of data aggregation. For example, a filter may be applied to the dataset, for example all of the imported data; a subset of the dataset, for example the data to be grouped, metadata associated with the data to be grouped, or combinations thereof; an aggregation of the data, for example, across the groups and/or buckets. For example, a filter may be applied to sentence data in a natural language setting. For example, if a filter is set to contain a specific word, for example, "Spokane" then data containing the word would be displayed. Additionally or alternatively, a filter may be applied to data within a group and/or bucket. Continuing the preceding example, the filter of "Spokane" may be applied to the group of data classified as "unassigned" inputs, where data containing the word "Spokane" and classified as "unassigned" would be displayed. Additionally or alternatively, the filter of "Spokane" could be applied to a group and/or bucket designated as "Location" where data containing the word "Spokane" in the group and/or bucket designated as "Location" would be displayed. Additionally or alternatively, a filter may be applied to the group and/or bucket designations. For example, a filter set to "Spokane" would cause buckets with the term in the name to be displayed. For example, "Spokane Valley", "Spokane Area", "Spokane Airport", etc.

Additionally or alternatively, various embodiments contemplate returning search results based on a search. Various embodiments contemplate providing simple keyword searches as well as formatted searches of multiple terms that may have an order and/or proximity defined.

Illustrative Clustering

Various embodiments contemplate clustering a set of inputs based on similarities. For example, a set of inputs may be clustered according to various algorithms. Various embodiments contemplate that the clustered data may generate groups and/or buckets. Additionally or alternatively, the clustered data may provide useful insights to a user as to the structure and composition of the data. Various embodiments contemplate using vocabulary terms to generalize and/or specify various potential inputs. Additionally or alternatively, concepts, types, and/or other features may be used to enhance the effectiveness of the clustering. Additionally or alternatively, various embodiments contemplate removing and/or ignoring certain features when clustering. For example, in a natural language setting, some words may be used frequently and are not helpful in grouping the data. For example, the term "the" may not be helpful and may be ignored. Additionally or alternatively, in a natural language setting dealing with a specific subject for example, an organization, the organization's name may not be helpful in determining useful groupings and may be ignored.

Various embodiments contemplate clustering a set of inputs, a subset of inputs, or combinations thereof. For example, a clustering procedure may be applied to all of the inputs loaded. Additionally or alternatively, the clustering procedure may be applied to a subset of the inputs loaded. For example, the clustering procedure might be applied to metadata associated with the loaded inputs, the sentence data of the loaded inputs, an intent associated with the loaded inputs, a concept associated with the loaded inputs, or combinations thereof. Additionally or alternatively, the clustering procedure may be applied to a category of data, for example data contained in a previously designated group and/or bucket, data that has not been designated a group and/or bucket, for example "unassigned" data, or combinations thereof.

Additionally or alternatively, various embodiments contemplate creating clusters with a hierarchy. For example, a clustering procedure may produce a single level of clusters. However, a clustering procedure may be configured to produce clusters with sub-clusters.

Various embodiments contemplate the level of clustering. For example, various criteria may be used to determine when the clustering procedure will end. For example, various embodiments contemplate that a maximum number of inputs in a given cluster may be set. For example, a cluster member maximum threshold may be set to 100. When a cluster reaches the cluster member maximum during the clustering procedure, the clustering procedure ends and returns the resulting clusters. Additionally or alternatively, a minimum number of clusters may be set. For example, using an agglomerative clustering method, a large number of clusters exist, where as the clustering procedure continues and data is clustered with other data, the total number of clusters is reduced until the minimum number of cluster threshold is reached. Various embodiments contemplate that this may reduce over clustering and/or over simplification of the data.

Various embodiments contemplate various clustering approaches and techniques. For example, hierarchical clustering may be used to discover features of data. Various embodiments contemplate using agglomerative (hierarchical) clustering. Various embodiments contemplate that a benefit of this approach may allow the clustering procedure to perform at near linear time complexity. Various embodiments contemplate that this may be a material improvement over both the O(n3) time complexity of the naive algorithm and the O(n2) complexity of other heap-based and average distance agglomerative methods. Various embodiments contemplate that this may allow for processing large data sets, for example large text corpora.

Hierarchical clustering may be use as a part of algorithms that use an ordered tree of objects to process. These algorithms may be used when a series of unconnected objects with no explicit ordering is evaluated. A goal of hierarchical clustering may be to generate a tree of nested clusters that links the data according to some distance function (sometimes known as a dissimilarity function). Algorithms using hierarchical data can be used in bioinformatics, image processing, computational geometry, and computational linguistics to name a few areas.

In general, hierarchical clustering may use a monotonic similarity function that can be applied to each pair of clusters to produce a measure of the similarity of the two clusters. typically the function is one of the following types:

a. Single link—Cluster similarity is the similarity of the most similar members of each cluster.
b. Complete link—Cluster similarity is the similarity of the least similar members of each cluster.
c. Group-average—Cluster similarity is the average similarity between members of the two clusters.

Often, hierarchical clustering algorithms come primarily in two forms: top-down and bottom-up. Essentially these algorithms generate the same result but through different methods.

For example, top-down clustering, often called divisive clustering, often starts by adding all of the data points to a single cluster and then dividing the cluster by looking for internal clusters with maximal separation. Then the sub-clusters are split to form new clusters and the algorithm continues until the sub-clusters contain only one data point.

Additionally or alternatively, bottom-up clustering, also known as agglomerative clustering often starts by making each data point into its own cluster. These separate clusters may be joined by finding the most similar sub-clusters and joining them into higher level clusters. In the canonical algorithm, the process continues until all the data is in one cluster. In practice, clustering may be thresholded so that clusters that are "far apart" are not joined. Often the result then will be a number of trees that are rooted in different top-level clusters.

Often, the naive agglomerative clustering algorithm is simple to code but has O(n3) time complexity, often making it less suitable for realistic data sets in the text processing realm. Additionally, there are some simple techniques for coding an O(n2) time complexity implementation.

In general agglomerative methods use a similar mechanism, for example, a similarity test. Similarity tests can take many forms, but they often provide a way of measuring how similar different cluster are to each other. The similarity measure can be thought of as an inverse distance. For example, one valid similarity measure is an inverse Euclidian distance:

$$s(a,b)=1/1+d(a,b)$$

where d(a, b) is the L2 distance between clusters a and b.

The flowing is an illustrative algorithm showing an example of a local order agglomerative clustering.

```
1:   procedure CLUSTER(data)
2:       Clusters ← {for each datum in data}
3:       A ← Clusters:Select(Any)
4:       B ← Clusters:Select(MostSimilarTo;A)
5:       while |Clusters| > 1 do
6:           C ← Clusters:Select(MostSimilarTo;B)
7:           if A = B then
8:               Clusters.Remove(A)
9:               Clusters.Remove(B)
10:              A ← Cluster.New(A,B)
11:              Clusters.Add(A)
12:              B ← Clusters:Select(MostSimilarTo,A)
13:          else
14:              A ← B
15:              B ← C
```

A fast bottom-up clustering using local ordering may be used in clustering various types of data. For example, this algorithm and comparative results may be used in the domain of rendering as well as the processing of text, image, sound, etc. Often, local order agglomerative clustering may provide a method for building the clustering implementation with a time complexity slightly greater than O(n).

Various embodiments contemplate displaying the clustered data. For example, data that has been organized by similarity, for example, similar language, may be displayed to communicate the volume of inputs in each cluster. For example, the clustered inputs may be classified as high, medium, and low volume clusters, where the size of the cluster may represent the volume of inputs in that cluster. Various embodiments contemplate labeling a cluster with the primary features, for example, terms, that the data are clustered around.

FIG. 13B shows an illustrative display 1302 of clustered data.

Additionally or alternatively, filters may be applied to the clusters and/or clustered data. For example, a filter may be applied to the input data that will be clustered. This, for example, may limit which data is clustered influencing the resulting clusters. Additionally or alternatively, the filter may be applied to the data already clustered limiting what data is displayed, but not necessarily affecting the underlying clusters.

Figure 14:
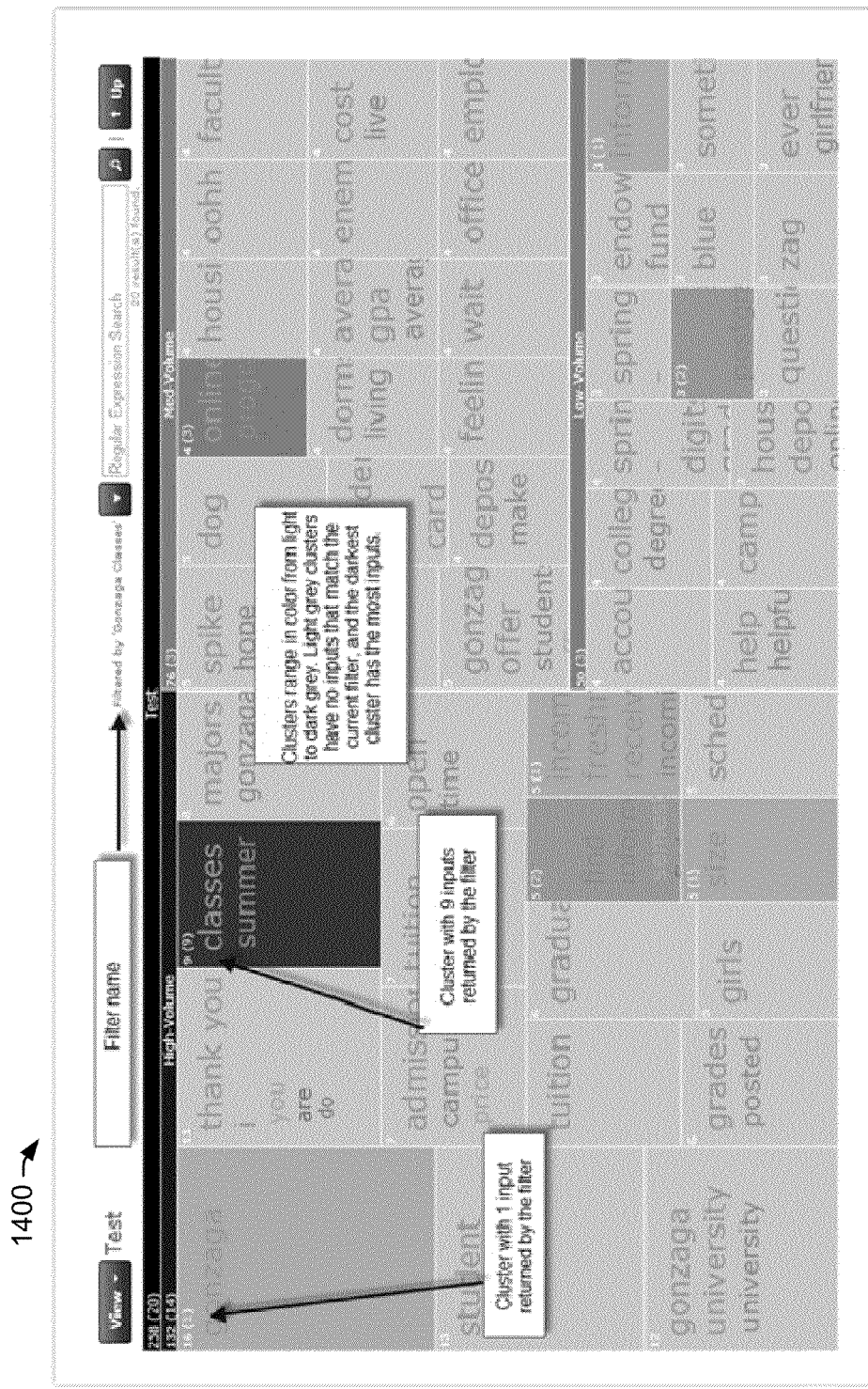

FIG. 14 shows an example view 1400 of a filter being applied to clustered data.

Various embodiments contemplate leveraging mappings. For example, a dataset may contain elements that on the surface appear to be disparate, but for the purposes of a given situation may be considered as a single element. As such, when one or more of the disparate features appears, for clustering and/or grouping procedures, a replacement feature may be substituted. For example, in a natural language setting directed to a medical application, terms such as Ritalin, Prozac, Xanax, insulin, aspirin, may be mapped to the term "medicine." This may allow data directed to the concept of medicine to be grouped together more readily.

Illustrative Bucket Creation

Various embodiments contemplate that buckets may be containers that may be used to group inputs that share selected features. For example, in a natural language environment, an intent may be a selected feature that a group of inputs share. Various embodiments contemplate grouping inputs in a variety of ways. For example, the buckets may be manually created, imported, or a combination thereof. For example, a bucket may be given a descriptive name and may also include comments. Various embodiments contemplate that buckets may be searched, filtered, and/or displayed based at least in part on the bucket name and/or comments.

Additionally or alternatively, sub-buckets may be created. For example, each bucket may have one or more children buckets. A possible benefit is that it allows organization of the buckets by topic area.

Various embodiments contemplate importing buckets from a list of buckets, and bucket comments from a database, from a Functional Presence Markup Language (FPML) file. Various embodiments contemplate that an intent of each unit, if present, may be imported into the bucket's comments, and the test questions of each unit may be imported as well.

Various embodiments contemplate organizing the buckets manually, automatically, or combinations thereof.

Various embodiments contemplate that tags may be associated with buckets. Various embodiments contemplate that tags may provide for increased searching and/or organizing efficiency and efficacy.

Various embodiments contemplate searching the buckets by part of a bucket name, one or more bucket tags, or combinations thereof.

Figure 15A:
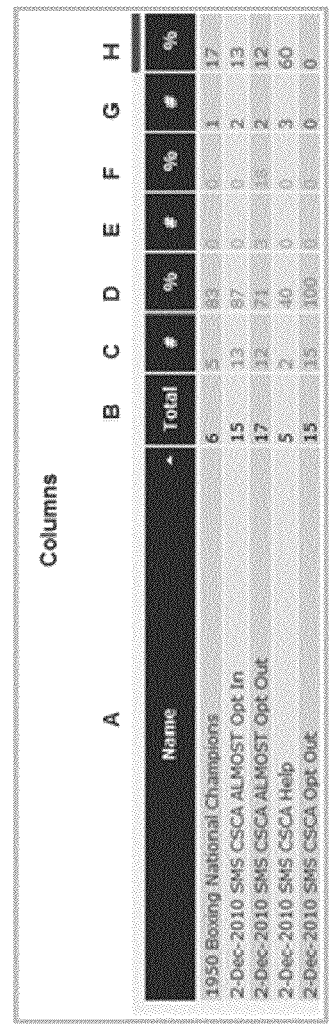

FIG. 15A shows an illustrative bucket summary 1500. For example, column A shows the Bucket name; column B shows the total inputs in bucket; column C shows a count of inputs in bucket that are also the "best match" bucket from a statistical model; column D shows a percentage (%) of inputs in the bucket which are also a "best match" from the statistical model; column E shows a count of inputs in the bucket that are not a best match, but matched a bucket in the same routing group; column F shows a percentage (%) of inputs in bucket that are not a best match, but matched a bucket in the same routing group; column G shows a count of inputs in bucket that are not a best match, and did not match a bucket in the same routing group (per the statistical model); and column H shows a percentage (%) of inputs in bucket that are not a best match, and did not match a bucket in the same routing group (per the statistical model).

Figure 15B:
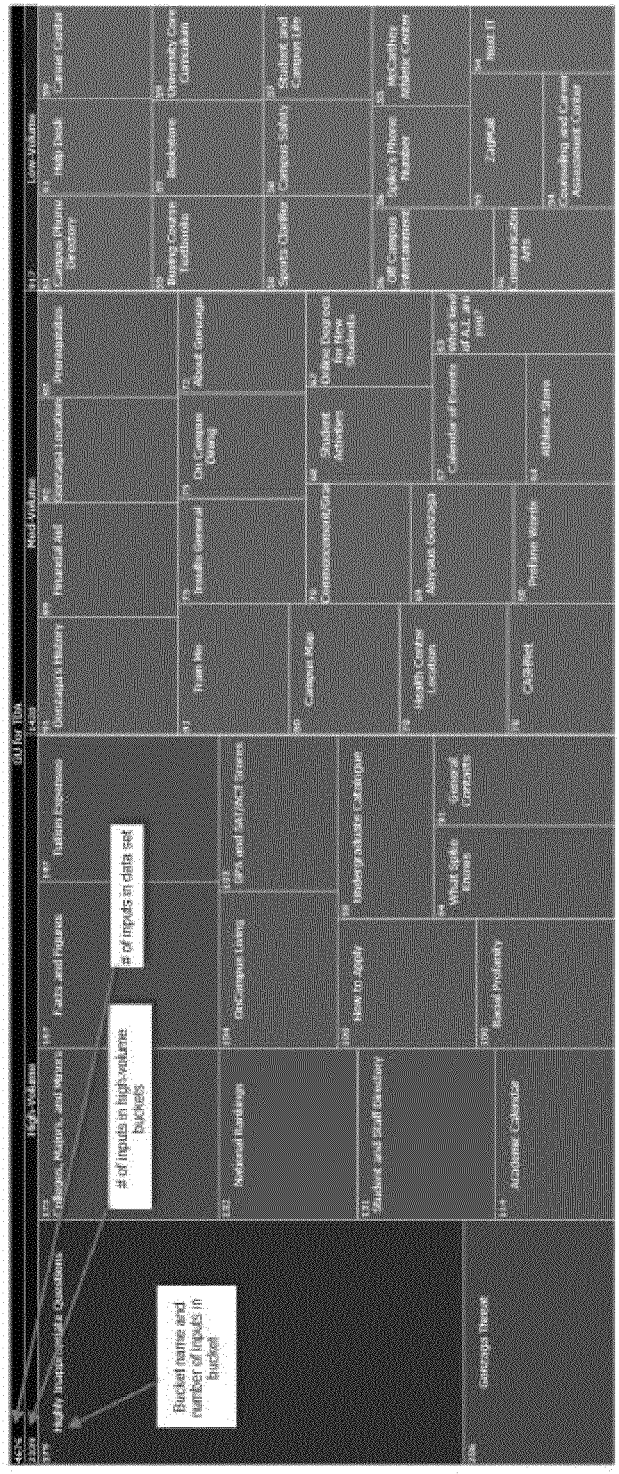

FIG. 15B shows a graph view of the buckets 1502. For example, various embodiments contemplate viewing the data in a graph view. Various embodiments contemplate allowing views of the buckets in a manner similar to the cluster view. Graph view may organize your buckets in high, medium, and low volume groups according to the number of inputs in each bucket. Each "cluster" in a group may be labeled with the bucket name, and may contain the inputs within that bucket.

Illustrative Bucket Population

Various embodiments contemplate various ways of populating a bucket. For example, when viewing inputs in an unassigned list view, a bucket view, or a cluster view, one or more of the inputs may be selected and moved to a selected bucket.

Additionally or alternatively, various patterns may be identified and or assigned to a bucket. For example, language that represents the key ideas or "intent" of each input can be flagged. The combination of words that represent the intent for an input may be referred to as a "pattern." These patterns may be helpful as language models are built within the system.

FIG. 16A shows an example 1600 of language being selected from an input. Various embodiments contemplate various methods of indicating an importance. For example, the selected features may be selected by clicking, highlighting, among other approaches. Additionally or alternatively, selected features may be shown as being selected, for example, by a box.

FIG. 16B shows an illustrative example of a representation 1602 of a pattern created from the indications of FIG. 16A.

Various embodiments contemplate allowing for searches of the buckets, the data, clusters, or other structures with patterns. For example, after associating patterns with a bucket, those patterns may be used to find inputs that match that pattern. When looking for inputs that match a pattern, the system may search both bucketed and unbucketed inputs. The results of the search may indicate whether the matching input is currently in a bucket, or unbucketed.

Figures 17A, 17B:
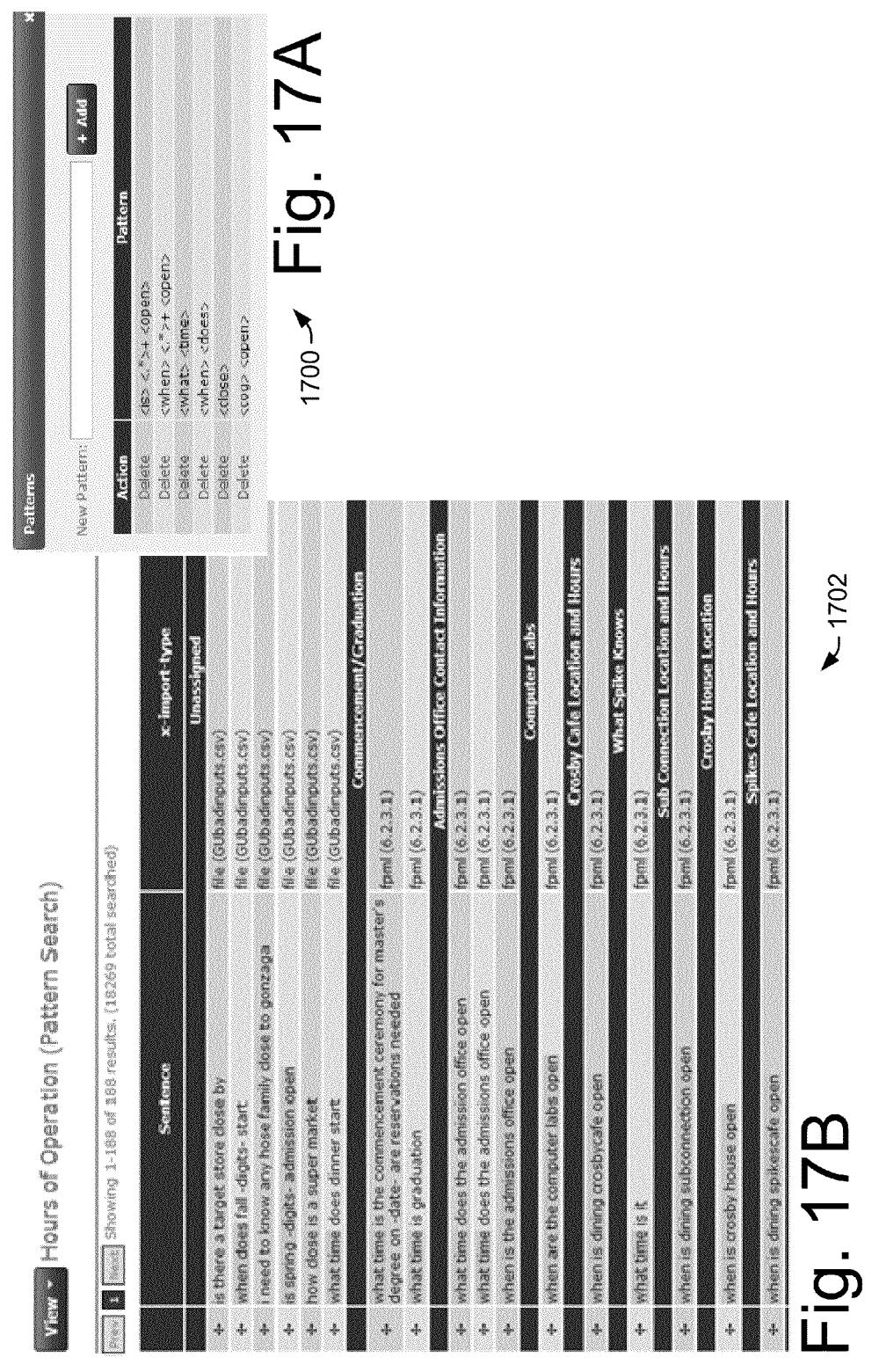

FIG. 17A shows an illustrative example of a representation 1700 of various patterns that may be used to search various structures of the system, for example, buckets.

FIG. 17B shows an illustrative view 1702 of search data returned based on the patterns shown in FIG. 17A. Various embodiments contemplate that the returned inputs may be classified and/or grouped by the current buckets.

Various embodiments contemplate using the pattern approach to group and/or bucketize input data. For example, a pattern model may be generated and run against the input data.

Various models contemplate building a classifier model that may be used to predict a bucket for inputs of a dataset. For example, the classifier model may be generated based at least in part on a portion of input data being assigned to appropriate buckets. Various embodiments contemplate that as the number of inputs in the buckets increases, the classifier model's suggestions will improve.

Various embodiments contemplate that patterns may be integrated with the classifier model to further strengthen the model.

Various embodiments contemplate using a subset of buckets when generating a model. For example, there may be buckets that a user would like to exclude from a model. For example, a user may designate an "ignore these inputs" buckets for various reasons. If a user decides to exclude one or more buckets a model may be generated without the specified one or more buckets.

Various embodiments contemplate viewing the results of the classifier model in various ways. For example, a best bucket match, a bucket pie chart, suggested buckets, and/or a table view may be available.

For example, the best bucket match view may provide metadata that is created for some or all inputs. If a selected statistical model matches the input to an existing bucket, the bucket may be identified in view. Various embodiments contemplate that a meaningful match may or may not be returned for every input.

Various embodiments contemplate a bucket pie chart view that may provide a bucket pie chart created for each bucket included in the classifier model. The pie chart may allow visualization the some or all of following:
  a. Green: Inputs where current bucket is also the statistical best match
  b. Yellow: Inputs where current bucket is NOT the statistical best match, but the best match shares the same parent with the current bucket
  c. Red: Inputs where current bucket is NOT the statistical best match, and the best match DOES NOT share the same parent with the current bucket OR no match was returned.

Various embodiments contemplate a suggested buckets view where unassigned inputs may be grouped by the best bucket column value in a view similar to the auto-cluster view.

Various embodiments contemplate a table view where details about the total number of inputs in each bucket, and a breakdown between green/yellow/red categories may be shown. A similar indication strategy may be used as discussed with respect to the bucket pie chart view.

Figures 18A, 18B:
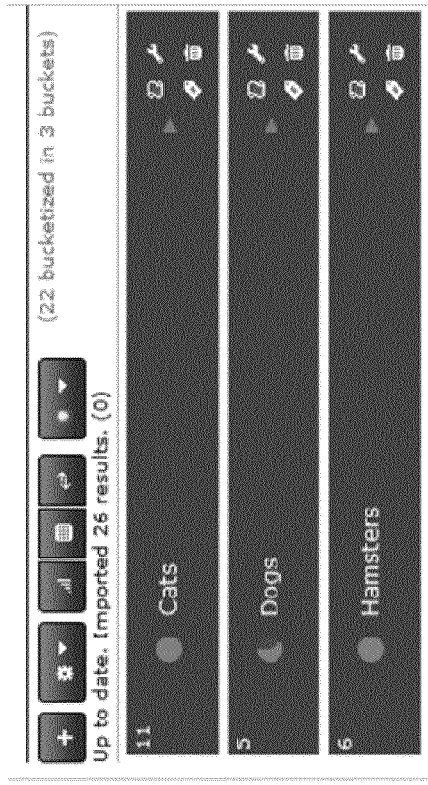

FIG. 18A shows an illustrative example of a best bucket match view 1800. For example, the first column indicates the input data, the second column indicates a best bucket match suggestion, while the third column shows a confidence score. Various embodiments contemplate that a confidence score may be normalized to range between 0 and 1 where a larger number indicates a higher confidence of a match.

FIG. 18B shows an example of a bucket pie chart 1802. For example, the Cats bucket has a solid green circle indicating that the 11 inputs of the bucket are a best match for the cats bucket. Similarly, the Hamsters bucket indicates the 6 inputs are best matched to the bucket. However, the Dogs bucket shows that a portion of the circle is red indicating that at least some of the inputs are not the best statistical match for the dogs bucket. The size of the red portion may indicate the percent of the inputs that are not the best match for the bucket.

Figure 19:
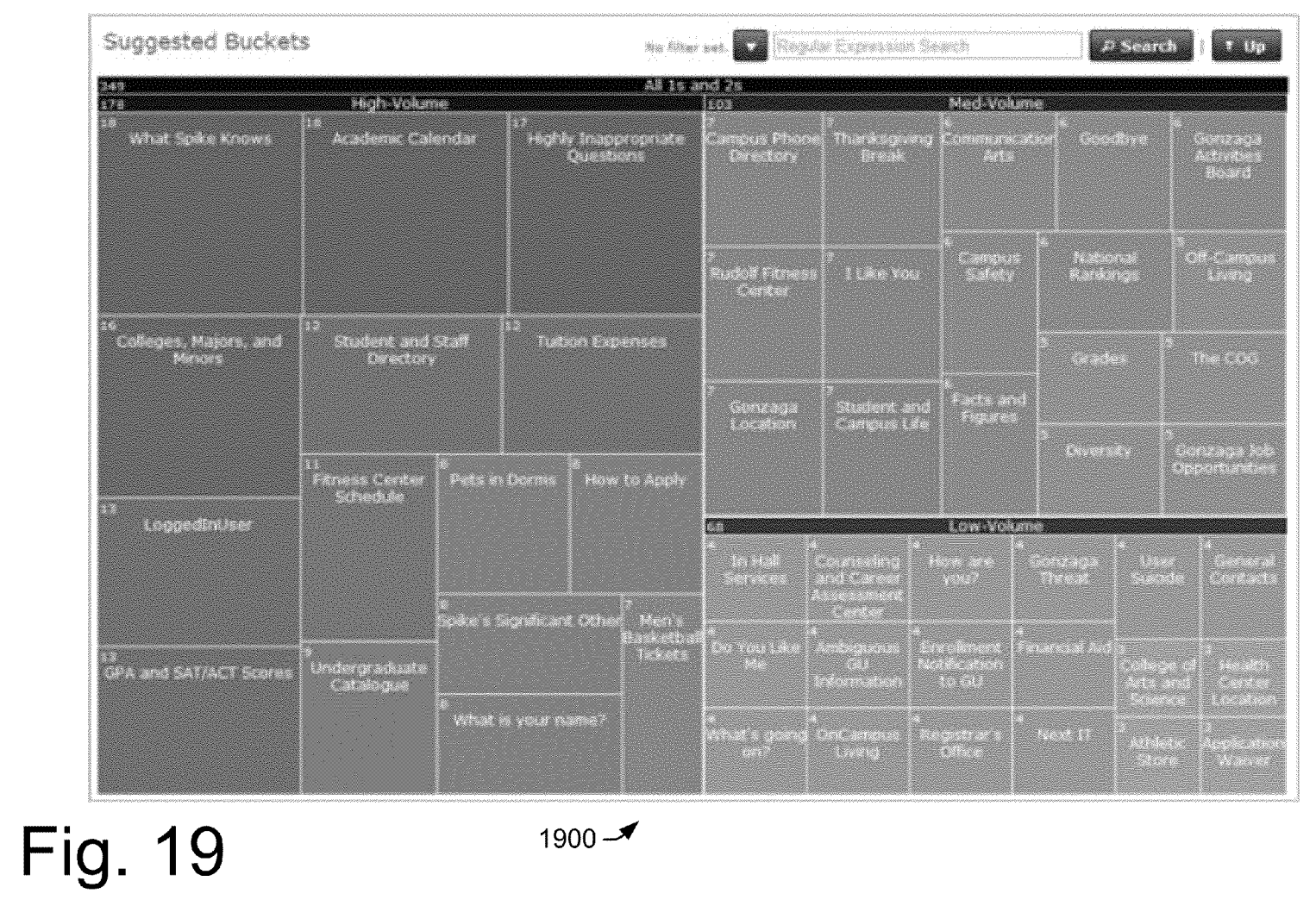

FIG. 19 shows an example of a suggested bucket view 1900. Various embodiments contemplate that a click on a bucket area in the graph while in suggested buckets view, that bucket may now be highlighted and may be brought to focus in the left-hand pane, and the suggested bucket may be opened in the graph view so the classified inputs may be viewed.

Figure 20:
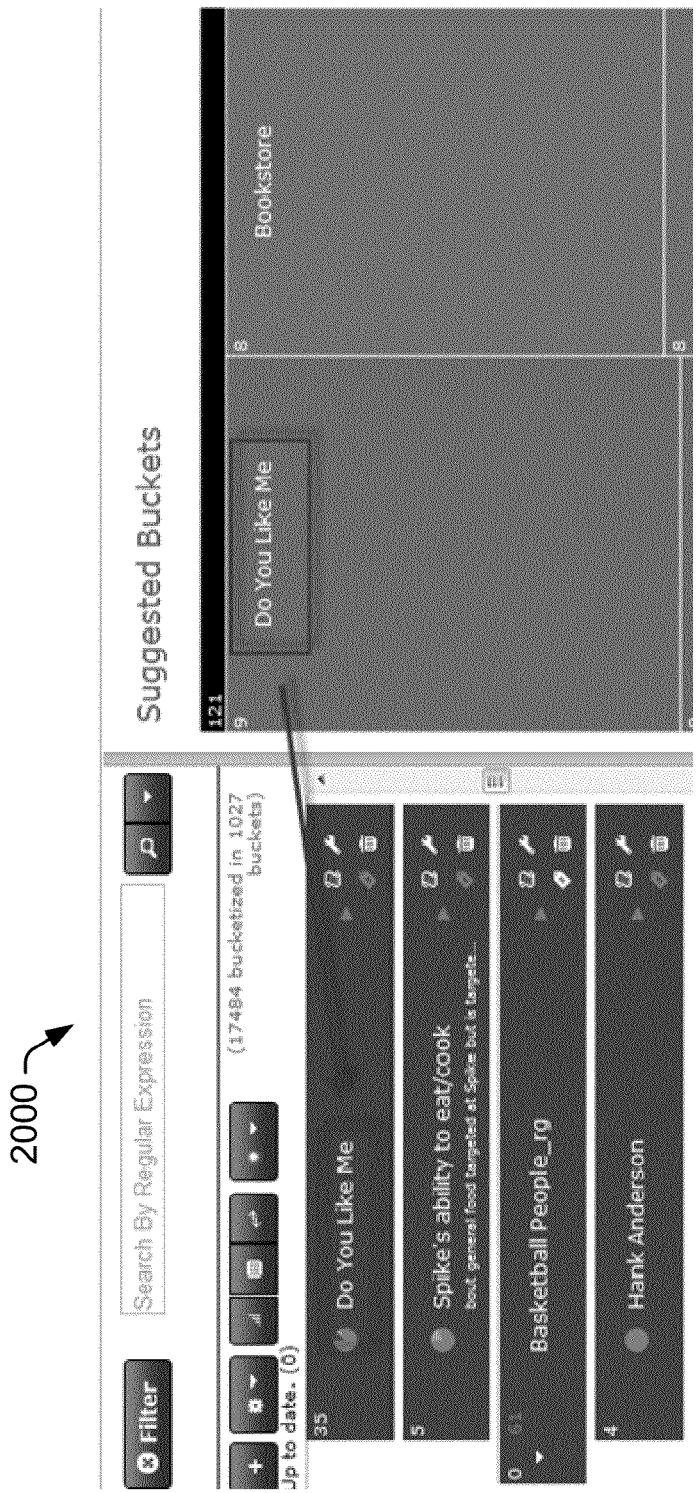

FIG. 20 shows an example of a table view 2000.

Single or multiple classifiers may be run in various embodiments. For example, multiple classifiers may be run where multiple results may be displayed at the same time.

Figure 21:
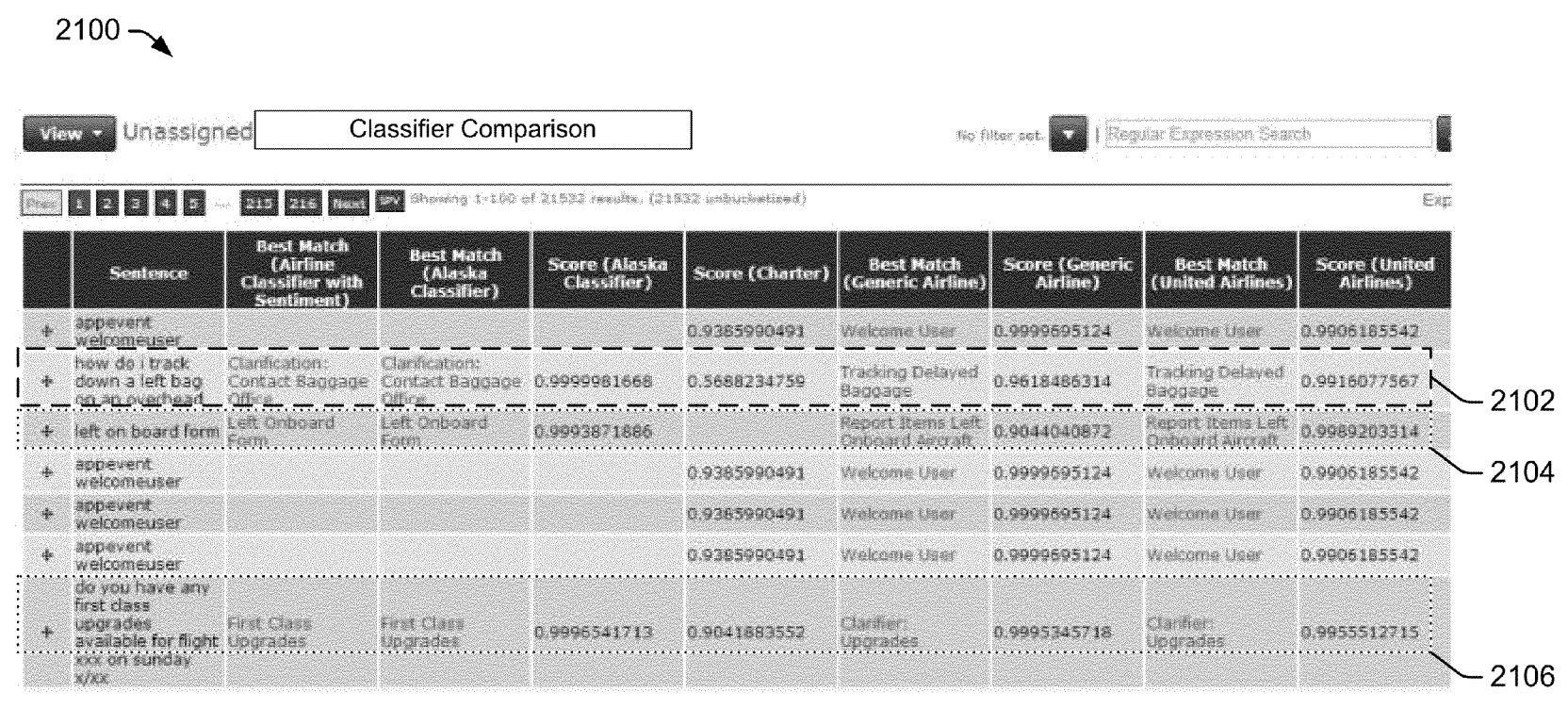

FIG. 21 shows an example view 2100 of results from multiple classifiers. For example, row 2102 shows an example where at least one of the multiple classifiers did not completely agree on a designation. For example the Alaska Classifier, Generic Airlines, and United Airlines classifiers had a relative high confidence in each classification, however, the Charter classifier had a relatively lower confidence.

Concordancer Model

Various embodiments contemplate classifying inputs by the language in the sentences. For example, the data may be examined on a word, term, phrase, sentence, document, or other basis. For example, a set of terms may be selected, and a breakdown by volume of terms in your data set may be returned.

Figure 22:
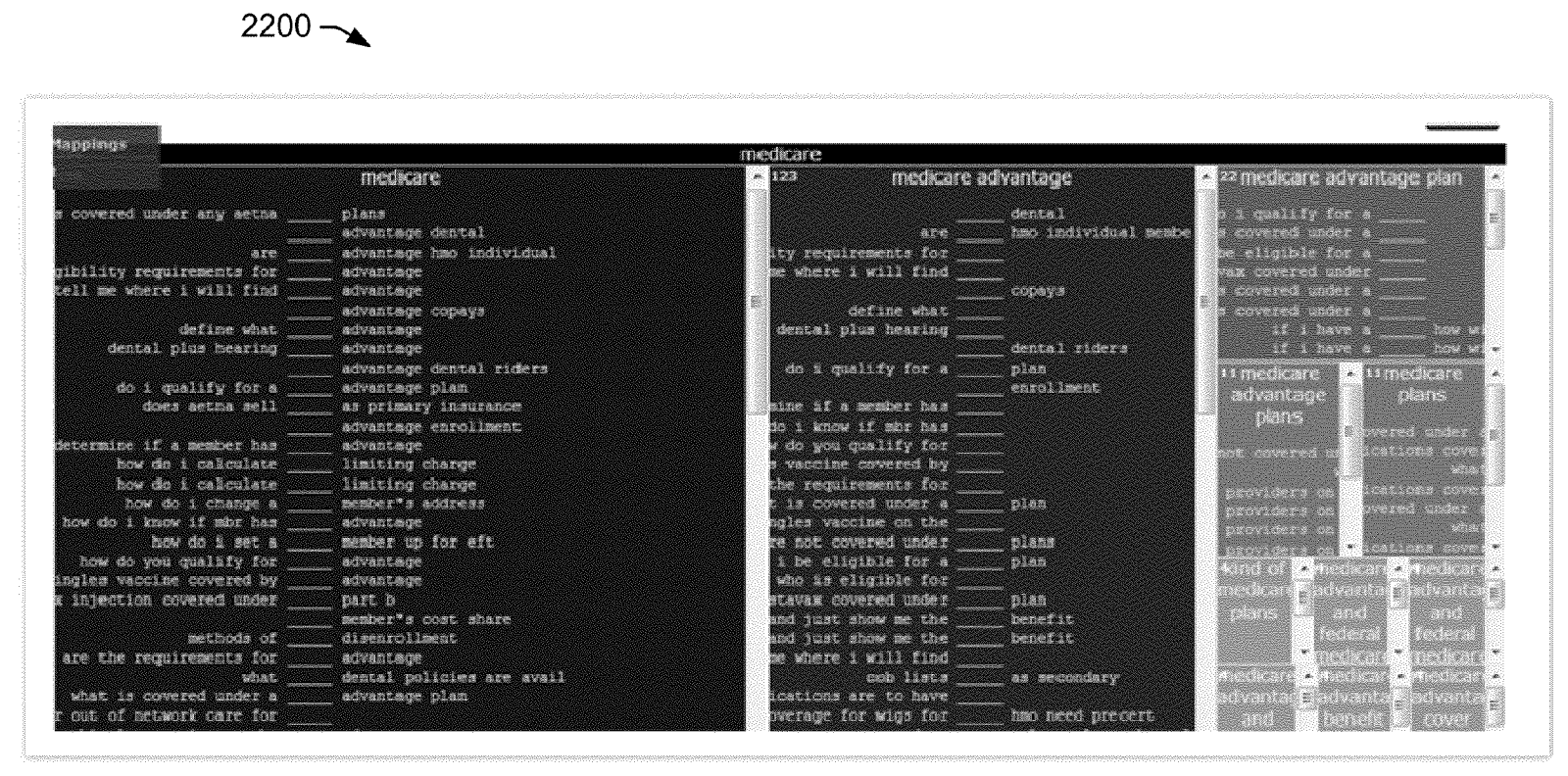

FIG. 22 shows an illustrative view 2200 of a node of the previously discussed breakdown of the data. Various embodiments contemplate displaying groupings of the main term, and any related terms that contain the same sort of language around them. For example, in the "Medicare" node, entries for "Medicare Advantage," "Medicare Advantage Plan," and others also appear. Various embodiments contemplate that the displayed data may also be used to populate a bucket. Various embodiments contemplate that a search may be performed for a specific feature or term where a similar display of results may be returned.

Testing

Once a model is created, preliminary testing may be performed to check for inputs may need to be added or corrected.

Figure 23:
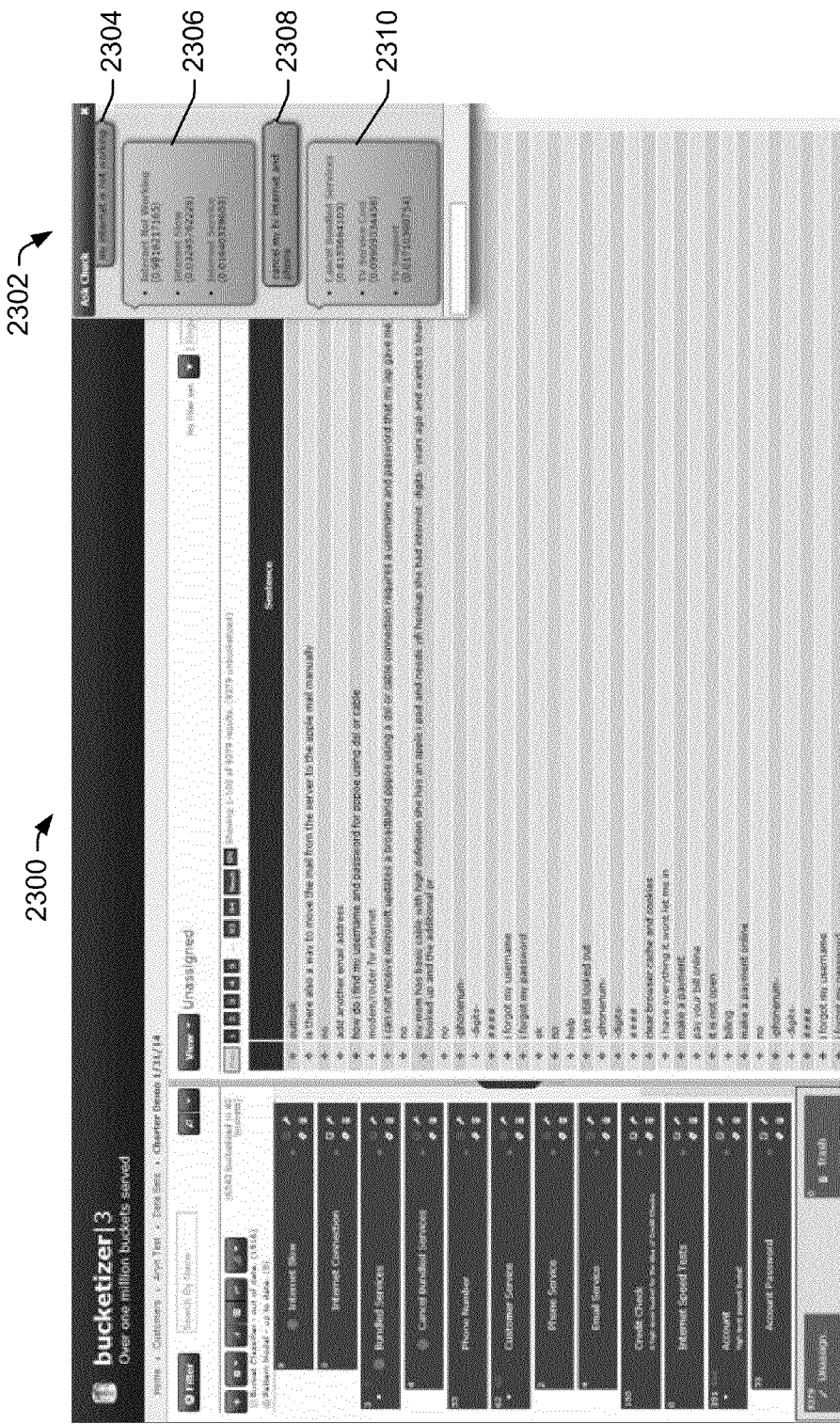

FIG. 23 shows an example testing environment 2300. For example, an interface may appear where inputs may be tested. For example a window 2302 may be accessed to enter test data 2304 and 2308, where a set of candidate buckets may be suggested with a relative confidence 2306 and 2310. Various embodiments contemplate that the confidence may be based at least in part on a statistical model.

Illustrative Patterns

Various embodiments contemplate application to a wide variety of data. For example, several of the example discussed in this disclose are directed to natural language applications. However, it is understood by one of ordinary skill in the art that the systems and methods discussed herein are readily available for application to other applications where patterns exist.

Figure 24A:
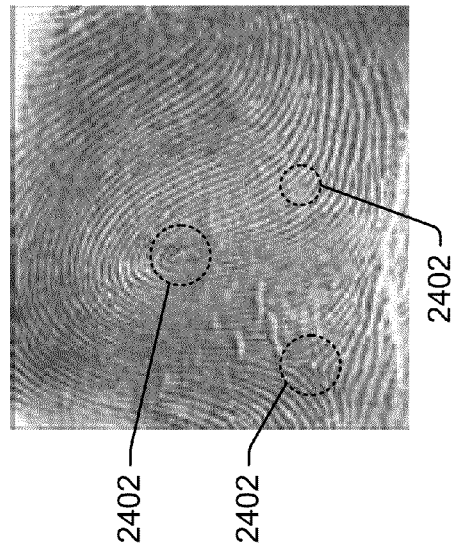
FIGS. 24A-B show illustrative applications of pattern recognition.
Figure 24B:
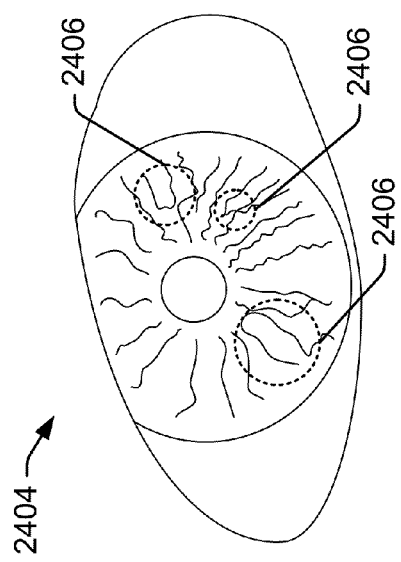

FIGS. 24A-B show two examples where the clustering and/or grouping or bucketizing may be effective. For example, FIG. 24A shows a finger print 2400 where various markers 2402 are present. For example, finger prints may contain whorls, loops, arches, branches, etc. that may be grouped and characterized on a large scale.

FIG. 24B shows an example of a retina 2404 with where various markers 2406 are present. Additional example include but are not limited to retina patterns; DNA sequencing patterns, finger prints, facial features including relative sizes and spacing, body features including relative sizes and spacing of joints, limbs, among other anatomical traits, illness symptoms.

Additionally or alternatively, various embodiments contemplate that the data may comprise words, phrases, sentence fragments, sentences, documents, photos, images, sounds, gestures, databases, language models, files, waves, mathematical patterns, equations, colors, tastes, touches, haptic feedback, temperatures, models, medical histories, test results, symptoms, disease states, drug treatments, behavioral patterns, handwriting patterns, languages, tomes, writing styles, scents, smells, writing styles, human motion (gait, walking patterns, gestures), animal motions, plant motions, microbe motions, muscle motions (heart palpitations), voices, identifications, or combinations thereof.

Illustrative Integration

As discussed above, the power to recognize similarities and dissimilarities in patterns in speech, sound, audio, among other types of data may be beneficial in many industries. For example, the systems and processes discussed herein are may be integrated into various aspects of peoples' lives. For example, virtual assistants and artificial intelligence systems may be a deeply integrated with various aspects of the present system and processes. For example, U.S. patent application Ser. No. 14/293,529 filed on Jun. 2, 2014 discusses applications and uses of virtual assistants among other features. The entire disclosure is hereby incorporated by reference in its entirety.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

What is claimed is:

1. One or more computer-readable storage media device storing computer-readable instructions that, when executed, instruct one or more processors to perform operations comprising:
    providing recommended groupings of clustered data based at least in part on clustering data of a first data set;
    receiving an indication from a user that a first portion of the first data set is associated with a bucket, the indication based at least in part on an evaluation by the user of at least one of the recommended groupings;
    generating a classification model based at least in part on the indication, one or more data signatures based at least in part on one or more of units of data, input patterns of data, order and proximity of terms, or combinations thereof, and one or more bucket patterns based at least in part on one or more cluster patterns, cluster signatures, input data patterns, or a combination thereof;
    generating classified data based at least in part on applying the classification model to a second data set based at least in part on comparing a data signature of the one or more data signatures to a bucket pattern of the one or more bucket patterns;
    identifying a subset of data of the first data set, of the second data set, or a combination thereof;
    providing another recommended groupings of clustered data based at least in part on clustering data of the subset of data;
    receiving another indication from a user that a first portion of the subset of data is associated with another bucket, the another indication based at least in part on an another evaluation by the user of at least one of the another recommended groupings;
    generating another classification model based at least in part on the another indication; and
    generating another classified data based at least in part on applying the another classification model to a third data set.

2. The one or more computer-readable storage media device of claim 1, wherein at least a portion of the classified data is associated with the bucket.

3. The one or more computer-readable storage media device of claim 1, wherein the indication comprises a selection of one or more inputs affirmatively associated with the bucket.

4. The one or more computer-readable storage media device of claim 1, wherein the indication comprises a selection of one or more subunits of one or more inputs affirmatively associated with the bucket.

5. The one or more computer-readable storage media device of claim 4, wherein the selection of one or more subunits of the one or more inputs comprises a pattern identified in the one or more inputs.

6. One or more computer-readable storage media device storing computer-readable instructions that, when executed, instruct one or more processors to perform operations comprising:
    loading a plurality of classification models;
    applying the plurality of classification models to a data set;
    comparing a classification recommendation, the classification recommendation based at least in part on the plurality of classification models;
    displaying the classification recommendation, the classification recommendation comprising an input, a first suggested classification, based at least in part on a first result from a first model of the plurality of classification models, and a second suggested classification, based at least in part on a second result from a second model of the plurality of classification models;

receiving an indication from a user that the first suggested classification is a correct classification of the input, the indication comprising a selection of one or more subunits of one or more inputs affirmatively associated with the classification recommendation, the selection of one or more subunits of the one or more inputs comprising a pattern identified in the one or more inputs; and generating a classification model based at least in part on the indication from the user.

7. The one or more computer-readable storage media device of claim 6, the classification recommendation further comprising a first confidence associated with the first suggested classification, and a second confidence associated with the second suggested classification.

8. The one or more computer-readable storage media device of claim 6, the indication based at least in part on an evaluation by the user of at least a portion of the classification recommendation.

9. A method comprising:

providing recommended groupings of clustered data based at least in part on clustering data of a first data set;

receiving an indication from a user that a first portion of the first data set is associated with a bucket, the indication based at least in part on an evaluation by the user of at least one of the recommended groupings;

generating a classification model based at least in part on the indication, one or more data signatures based at least in part on one or more of units of data, input patterns of data, order and proximity of terms, or combinations thereof, and one or more bucket patterns based at least in part on one or more cluster patterns, cluster signatures, input data patterns, or a combination thereof;

generating classified data based at least in part on applying the classification model to a second data set based at least in part on comparing a data signature of the one or more data signatures to a bucket pattern of the one or more bucket patterns;

identifying a subset of data of the first data set, of the second data set, or a combination thereof;

providing another recommended groupings of clustered data based at least in part on clustering data of the subset of data;

receiving another indication from a user that a first portion of the subset of data is associated with another bucket, the another indication based at least in part on an another evaluation by the user of at least one of the another recommended groupings;

generating another classification model based at least in part on the another indication; and generating another classified data based at least in part on applying the another classification model to a third data set.

10. The method of claim 9, wherein at least a portion of the classified data is associated with the bucket.

11. The method of claim 9, wherein the indication comprises a selection of one or more inputs affirmatively associated with the bucket.

12. The method of claim 9, wherein the indication comprises a selection of one or more subunits of one or more inputs affirmatively associated with the bucket.

13. The method of claim 12, wherein the selection of one or more subunits of the one or more inputs comprises a pattern identified in the one or more inputs.

14. A method comprising:

loading a plurality of classification models;

applying the plurality of classification models to a data set;

comparing a classification recommendation, the classification recommendation based at least in part on the plurality of classification models;

displaying the classification recommendation, the classification recommendation comprising an input, a first suggested classification, based at least in part on a first result from a first model of the plurality of classification models, and a second suggested classification, based at least in part on a second result from a second model of the plurality of classification models;

receiving an indication from a user that the first suggested classification is a correct classification of the input, the indication comprising a selection of one or more subunits of one or more inputs affirmatively associated with the classification recommendation, the selection of one or more subunits of the one or more inputs comprising a pattern identified in the one or more inputs; and generating a classification model based at least in part on the indication from the user.

15. The method of claim 14, the classification recommendation further comprising a first confidence associated with the first suggested classification, and a second confidence associated with the second suggested classification.

16. The method of claim 14, the indication based at least in part on an evaluation by the user of at least a portion of the classification recommendation.

* * * * *